(12) United States Patent
Lee

(10) Patent No.: US 12,395,824 B2
(45) Date of Patent: Aug. 19, 2025

(54) METHOD, DEVICE, AND COMPUTER PROGRAM FOR AUDIO ROUTING IN WIRELESS COMMUNICATION SYSTEM, AND RECORDING MEDIUM THEREFOR

(71) Applicant: INTELLECTUAL DISCOVERY CO., LTD., Seoul (KR)

(72) Inventor: Jea Ho Lee, Cheongju-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 0 days.

(21) Appl. No.: 18/416,046

(22) Filed: Jan. 18, 2024

(65) Prior Publication Data

US 2024/0168703 A1     May 23, 2024

Related U.S. Application Data

(63) Continuation of application No. 17/597,036, filed as application No. PCT/KR2020/008151 on Jun. 23, 2020, now Pat. No. 11,907,613.

(30) Foreign Application Priority Data

Jun. 24, 2019    (KR) ........................ 10-2019-0075281

(51) Int. Cl.
    *G06F 15/16*         (2006.01)
    *G06F 3/16*          (2006.01)
    (Continued)

(52) U.S. Cl.
    CPC .............. *H04W 4/80* (2018.02); *G06F 3/165* (2013.01); *H04L 65/40* (2013.01); *H04L 65/611* (2022.05); *H04L 65/80* (2013.01); *H04L 67/30* (2013.01)

(58) Field of Classification Search
    CPC .......... G06F 3/165; H04W 4/80; H04L 65/40; H04L 65/80; H04L 67/30
    See application file for complete search history.

(56) References Cited

U.S. PATENT DOCUMENTS

2003/0081796 A1    5/2003    Bray et al.
2017/0192745 A1*    7/2017    Sunstrum ................ H04W 4/80
    (Continued)

FOREIGN PATENT DOCUMENTS

KR    10-2007-0099019 A    10/2007
KR    10-2010-0036351 A    4/2010
    (Continued)

OTHER PUBLICATIONS

International Search Report for PCT/KR2020/008151, dated Sep. 25, 2020.
(Continued)

*Primary Examiner* — Normin Abedin
(74) *Attorney, Agent, or Firm* — Sughrue Mion, PLLC

(57) ABSTRACT

The present disclosure relates to audio routing in a wireless communication system. A method by which a first device performs audio routing in a wireless communication system, according to one embodiment of the present disclosure, comprises the steps of: transmitting audio routing basic information to a second device; receiving an audio routing modification request from the second device; and transmitting, to the second device, audio-routing-related information modified on the basis of the audio routing modification request, wherein the audio routing basic information may comprise at least one of available audio routing device information, set audio routing device information, and audio routing content type information.

10 Claims, 29 Drawing Sheets

(51) Int. Cl.
*H04L 65/40* (2022.01)
*H04L 65/611* (2022.01)
*H04L 65/80* (2022.01)
*H04L 67/30* (2022.01)
*H04W 4/80* (2018.01)

(56) References Cited

U.S. PATENT DOCUMENTS

2020/0314521 A1* 10/2020 El Guindi ............ H04R 1/1041
2022/0217186 A1    7/2022 Hannu et al.

FOREIGN PATENT DOCUMENTS

| KR | 10-2011-0000947 A | 1/2011 |
| KR | 10-2013-0090903 A | 8/2013 |
| KR | 10-2016-0042912 A | 4/2016 |
| KR | 10-2016-0105231 A | 9/2016 |
| WO | 2018/128994 A1 | 7/2018 |

OTHER PUBLICATIONS

Communication issued Nov. 20, 2024 in Application No. 10-2021-7040887.

* cited by examiner

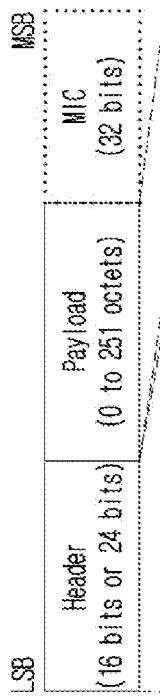
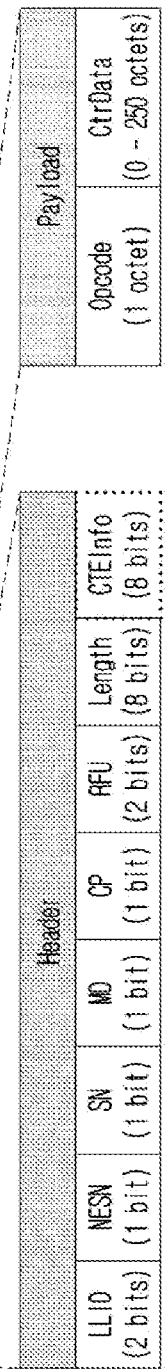
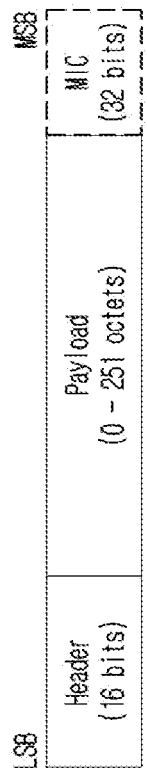
FIG. 19(a)
FIG. 19(b)
FIG. 19(c)
FIG. 19(d)

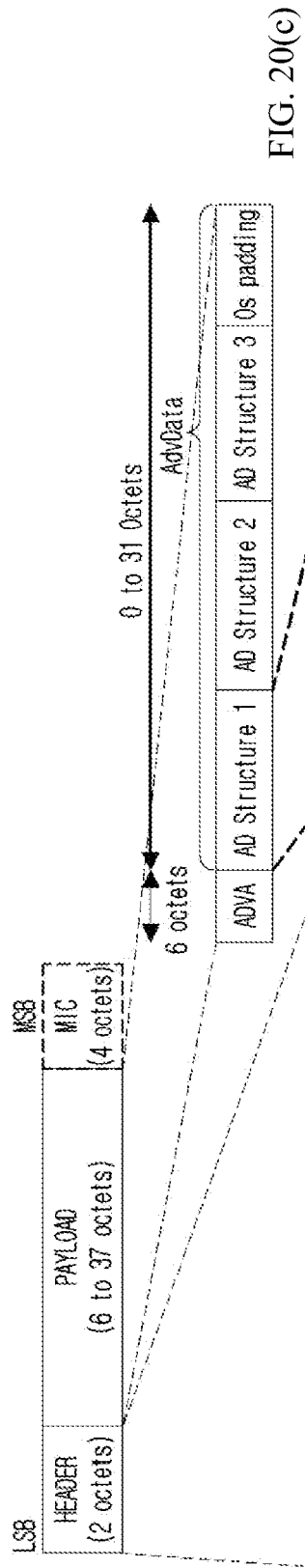
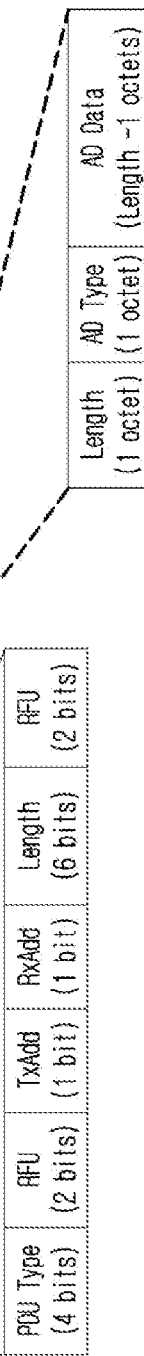
FIG. 20(a)
FIG. 20(b)
FIG. 20(c)
FIG. 20(d)

METHOD, DEVICE, AND COMPUTER PROGRAM FOR AUDIO ROUTING IN WIRELESS COMMUNICATION SYSTEM, AND RECORDING MEDIUM THEREFOR

CROSS REFERENCE TO RELATED APPLICATIONS

This is a Continuation application of U.S. application Ser. No. 17/597,036 filed Dec. 23, 2021, which is a National Stage of International Application No. PCT/KR2020/008151 filed Jun. 23, 2020, claiming priority based on Korean Patent Application No. 10-2019-0075281 filed Jun. 24, 2019. The disclosures of which are incorporated herein by reference in their entireties.

TECHNICAL FIELD

The present disclosure relates to audio routing in a wireless communication system, and specifically to a routing method, apparatus, computer program, and recording medium for determining a device for streaming audio data in a wireless communication system.

BACKGROUND

Bluetooth is a short-range wireless communication standard and includes BR (Basic Rate)/EDR (Enhanced Data Rate) technology and LE (Low Energy) technology. BR/EDR is also called Bluetooth classic, and includes BR technology applied from Bluetooth 1.0 and EDR technology applied from Bluetooth 2.0. Bluetooth LE (BLE) applied after Bluetooth 4.0 is a technology that supports transmission and reception of relatively large data with low power consumption.

The Bluetooth standard includes various profiles. For example, the Hands-Free Profile (HFP) defines what is necessary for one device to function as an audio gateway (AG) such as a smartphone and another device to function as a hands-free device such as a headset. In addition, A2DP (Advance Audio Distribution Profile) defines what is necessary for one device to function as an audio source such as a music player and another device to function as an audio sink such as a speaker.

As the spread of wireless devices increases recently, the demand for transmitting and receiving audio data in various topologies of many-to-many or M-to-N connection types is increasing. For example, streaming services that require a 5.1 channel environment are emerging, and it is being discussed to support a 5.1 channel environment using a plurality of Bluetooth portable speakers, breaking away from the limitations of a conventional 5.1 channel dedicated wired speaker. However, since the conventional Bluetooth audio technology was mainly developed in consideration of a use case of a one-to-one connection between two devices, it is not suitable for supporting audio data transmission/reception between multiple devices and delay is a big problem. In addition, as the number of Bluetooth audio devices increases, there is a problem in that power consumption for searching for peripheral devices increases.

In addition, audio routing for changing a device that performs audio processing on an active audio currently being streamed is required. However, a specific method for active audio routing is not provided.

DISCLOSURE

Technical Problems

A technical problem of the present disclosure is to support audio routing in a wireless communication system.

An additional technical problem of the present disclosure is to provide a method and an apparatus for changing audio routing configured for audio streaming currently being performed.

The technical problems to be achieved in the present disclosure are not limited to the technical problems mentioned above, and other technical problems not mentioned will be clearly understood by those of ordinary skill in the art to which the present disclosure belongs from the following description.

Technical Solution

According to an embodiment of the present disclosure, a method for performing audio routing by a first device in a wireless communication system may include transmitting audio routing basic information to a second device; receiving an audio routing modification request from the second device; and transmitting modified audio routing-related information to the second device based on the audio routing modification request, wherein the audio routing basic information includes at least one of available audio routing device information, configured audio routing device information, or audio routing content type information.

According to an embodiment of the present disclosure, a method for performing audio routing by a second device in a wireless communication system may include receiving, from a first device, audio routing basic information; transmitting, to the first device, an audio routing modification request based on the audio routing basic information; and receiving, from the first device, modified audio routing-related information, wherein the audio routing basic information includes at least one of available audio routing device information, configured audio routing device information, or audio routing content type information.

According to an embodiment of the present disclosure, a device for performing audio routing in a wireless communication system may include a transceiver for performing signal transmission and reception with another device; and a processor for controlling the transceiver and the device, wherein the processor is configured to: transmit, to the another device, audio routing basic information through the transceiver; receive, from the another device, an audio routing modification request through the transceiver; and transmit, to the another device, modified audio routing-related information based on the audio routing modification request through the transceiver, wherein the audio routing basic information includes at least one of available audio routing device information, configured audio routing device information, or audio routing content type information.

According to an embodiment of the present disclosure, a device for performing audio routing in a wireless communication system may include a transceiver for performing signal transmission and reception with another device; and a processor for controlling the transceiver and the device, wherein the processor is configured to: receive, from the another device, audio routing basic information through the transceiver; transmit, to the another device, an audio routing modification request based on the audio routing basic information through the transceiver; and receive, from the another device, modified audio routing-related information through the transceiver, wherein the audio routing basic information includes at least one of available audio routing device information, configured audio routing device information, or audio routing content type information.

The features briefly summarized above with respect to the present disclosure are merely exemplary aspects of the detailed description of the present disclosure that follows, and do not limit the scope of the present disclosure.

Technical Effects

According to the present disclosure, audio routing in a wireless communication may be supported.

According to the present disclosure, a method and an apparatus for changing audio routing configured for audio streaming currently being performed may be provided.

The technical effects of the present disclosure are not limited to the above-described effects, and other effects not mentioned herein may be understood to those skilled in the art from the following description.

BRIEF DESCRIPTION OF DRAWINGS

FIGS. 14(a) to 16(b) are diagrams illustrating a message exchange process between a server and a client to which the present disclosure is applicable.

FIGS. 19(a)-19(d) are diagrams illustrating examples of a data unit format to which the present disclosure is applicable.

FIGS. 20(a)-20(d) are diagrams illustrating examples of an advertisement unit format to which the present disclosure is applicable.

BEST MODE

Figure 1A:
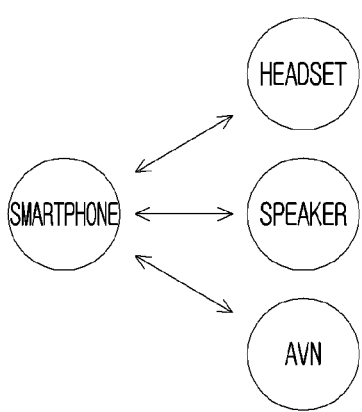
FIGS. 1(a) and 1(b) are diagrams is a diagram exemplarily illustrating a conventional audio connection type and an audio connection type to which the present disclosure is applicable.

Hereinafter, with reference to the accompanying drawings, embodiment of the present disclosure will be described in detail so that those of ordinary skill in the art to which the present disclosure belongs can easily implement them. However, the present disclosure may be embodied in several different forms and is not limited to the embodiments described herein.

In describing the embodiments of the present disclosure, if it is determined that a detailed description of a well-known configuration or function may obscure the gist of the present disclosure, a detailed description thereof will be omitted. And, in the drawings, parts not related to the description of the present disclosure are omitted, and similar reference numerals are attached to similar parts.

In the present disclosure, when a component is "connected", "coupled" or "accessed" to another component, it may include not only a direct connection relationship, but also an indirect connection relationship in which another component exists in the middle. Also, in the present disclosure, the terms "comprises" or "have" specify the presence of a recited feature, step, operation, element and/or component, but it does not exclude the presence or addition of one or more other features, steps, operations, elements, components and/or groups thereof.

In the present disclosure, terms such as "first" and "second" are used only for the purpose of distinguishing one component from other components and are not used to limit the components. And, unless otherwise noted, the terms do not limit the order or importance between the components. Accordingly, within the scope of the present disclosure, a first component in one embodiment may be referred to as a second component in another embodiment, and similarly, a second component in one embodiment may be referred to as a first component in another embodiment.

In the present disclosure, the components that are distinguished from each other are for clearly describing each characteristic, and do not necessarily mean that the components are separated. That is, a plurality of components may be integrated to form one hardware unit or a software unit, or one component may be distributed to form a plurality of hardware units or software units. Accordingly, even if not specifically mentioned, such integrated or dispersed embodiments are also included in the scope of the present disclosure.

The various embodiments of the present disclosure are not intended to list all possible combinations of components, but rather to illustrate representative aspects of the disclosure, and some or all of the components described in the various embodiments may be applied independently or in combination of two or more. That is, components described in various embodiments of the present disclosure do not necessarily mean essential components, and some may be optional components. Accordingly, an embodiment composed of a subset of components described in one embodiment is also included in the scope of the present disclosure. In addition, embodiments including other components in addition to components described in various embodiments are also included in the scope of the present disclosure.

Example methods of the present disclosure are expressed as a series of operations for clarity of description, but this is not intended to limit the order in which the steps are performed, and if necessary, each step may be performed simultaneously or in a different order. In addition, in order to implement the method according to the present disclosure, other steps may be included in addition to the illustrated steps, steps may be included except for some steps, or additional steps may be included except for some steps.

Terms used in the present disclosure is for the description of specific embodiments and is not intended to limit the claims. As used in the description of the embodiments and in the appended claims, the singular form is intended to include the plural form as well, unless the context clearly dictates otherwise. Also, the term "and/or" used in the present disclosure may refer to one of the related enumerations, or is meant to refer to and include all possible (or random) combinations of two or more thereof.

Definitions of terms used in the present disclosure are as follows.

An audio sink is an entity that receives audio data from an audio source.

An audio source is an entity that transmits audio data to the audio sink.

An audio channel is a single flow of coded or uncoded audio data.

An audio stream is a unidirectional logical communication channel that carries audio data flowing from the audio source to the audio sink. Audio data may flow on an audio stream session (ASS). An audio stream may carry audio data for one or more audio channels.

An audio group may include one or more synchronized audio streams.

A content type indicates a classification of content of an audio group. The classification may include whether the audio was initiated by the user. A content type indicates a classification of content of an audio group. The classification may include whether the audio was initiated by the user. Examples of the content type may include uncategorized audio (UncategorizedAudio), ringtone (Ringtone), system sound (SystemSound), satellite navigation (Satnav), call audio (CallAudio), media (Media), and the like.

Metadata is a variable-length data that describes and provides the context of audio data. Metadata may be defined for a higher layer.

An audio stream session (ASS) means to a unidirectional or bidirectional transmission/exchange process of an audio stream. An endpoint of an ASS corresponds to an audio input and/or audio output of an audio stream session, and may correspond to one device or a group of devices. The end of the ASS resides on the server and may be configured by the server or by the client. The server may store, change, and manage ASS state.

QoS (Quality of Service) means a quality of service for an audio stream and may correspond to a requirement for a specific service.

An audio location means a logical spatial rendering location intended for an audio channel within a spatial arrangement of a device for rendering audio. For example, the left and right location of a headset may correspond to an audio location. An audio location may be allocated to an audio channel.

CBIS (Connection Based Isochronous Stream) is a term defined in a core layer and is a concept corresponding to an audio stream in an ASS service. A unidirectional CBIS may have one audio stream, and a bidirectional CBIS may have two audio streams.

CBISS (Connection Based Isochronous Stream Set) is a term defined in a core layer and is a concept corresponding to an audio group in the ASS service.

An audio scene application (ASA) means an audio group performing a specific content type.

ASC (Audio Steam Capability) is a set of parameters necessary for configuring an audio session capability.

An audio advertisement is to discover the availability of ASA participation. An audio general advertisement is an audio advertisement that does not specify a target, and an audio directed advertisement is an audio advertisement for a specific target.

Isochronous data means data that is limited by time. For example, isochronous data may be time-dependent audio, such as television audio that needs to be synchronized with respect to an image of a video, or audio that needs to be synchronized and reproduced in multiple devices constituting a multi-channel.

An isochronous channel means a logical transmitting end used to transmit isochronous data from a transmitting device to one or more receiving devices.

An isochronous stream means a logical link carrying one or more isochronous channels.

FIG. 1 is a diagram exemplarily illustrating a conventional audio connection type and an audio connection type to which the present disclosure is applicable.

FIG. 1(a) illustrates an example of a BR/EDR audio connection type. In the case of BR/EDR, one-to-one connection type is supported. One device (e.g., a smartphone) may function as a central device, and may be connected one-to-one with each of several devices. That is, there may be multiple one-to-one connections. Accordingly, the service such as a phone call through a headset or music reproduction through a speaker may be supported. The center of service in this connection type is an audio source, and an audio sink such as a headset, a speaker, and AVN (Audio Video Navigation) may operate as a peripheral device of the audio source.

Figure 1B:
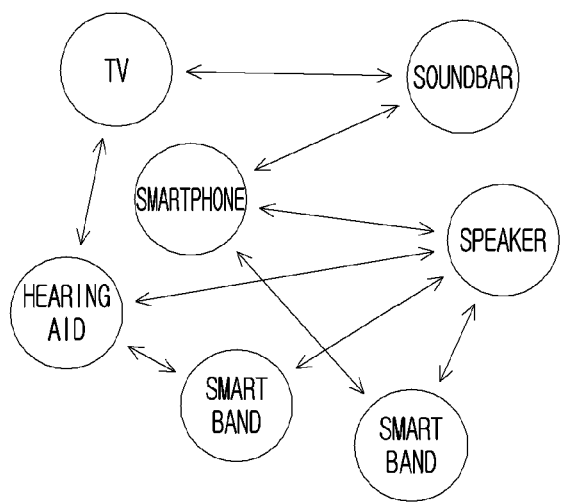

FIG. 1(b) illustrates an example of a BLE audio connection type. In the case of BLE, many-to-many connections may be supported. In this case, there may be a plurality of center devices such as a TV, a smart phone, and a gateway etc., and complex M-to-N connection may be configured. Accordingly, services of phone calls and music reproduction through the headset may be supported, and broadcast audio services such as alarms, doorbells, and advertising voices may be supported. The center of the service in this connection type is an audio sink, and the audio service may be used by moving multiple audio sources.

Figures 2A, 2B:
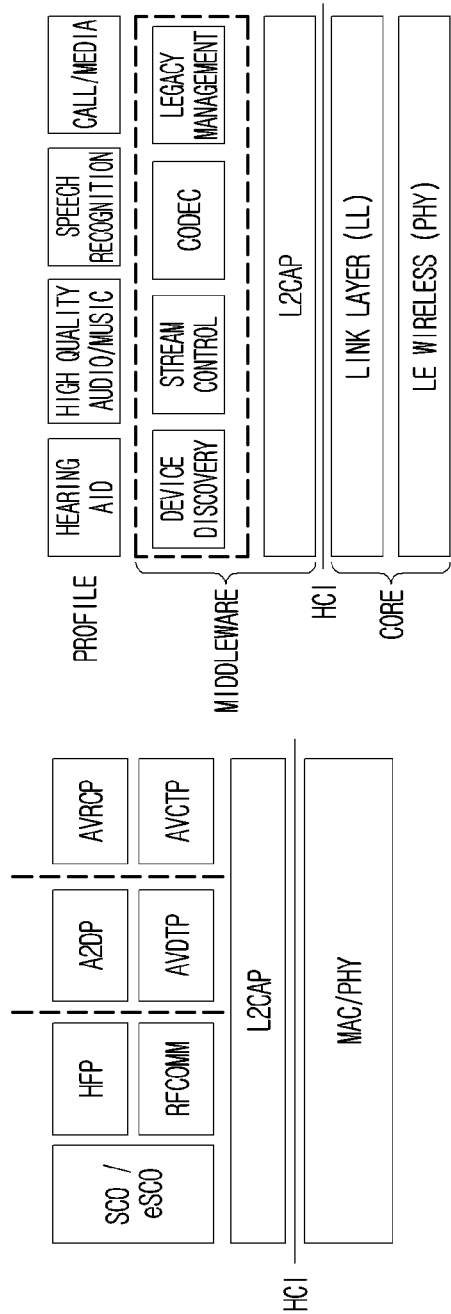
FIGS. 2(a) and 2(b) are diagrams is a diagram exemplarily illustrating a conventional audio-related protocol and an audio-related protocol stack to which the present is applicable.

FIGS. 2(a) and 2(b) are diagrams exemplarily illustrating a conventional audio-related protocol stack and an audio-related protocol stack to which the present disclosure is applicable.

FIG. 2(a) illustrates an example of an audio-related protocol stack. L2CAP (Logical Link Control & Adaption Protocol) layer functions as arbitration and mediation between the upper layer and the lower layer. In the upper layer, protocols such as RFCOMM (Radio Frequency Communication), AVDTP (Audio/Video Distribution Transport Protocol), AVCTP (Audio/Video Control Transport Protocol) etc. and profiles such as HFP (Hands Free Profile), A2DP (Advanced Audio Distribution Profile), AVRCP (Audio/Video Remote Control Profile) etc. may be included. The lower layer may include a MAC/PHY layer. The MAC (Medium Access Control) layer may include a link manager and a link controller, and the PHY (Physical) layer may include a BR/EDR radio. In addition, Synchronous Connection Oriented (SCO)/extended SCO (eSCO) may provide a synchronous data communication path for voice. As such, in BR/EDR, a protocol stack may be designed for each profile. The L2CAP layer, the BR/EDR protocol, the Generic Access Profile (GAP), and the BR/EDR profile layer may be collectively referred to as the host layer, and the link manager, link controller, and BR/EDR radio layer may be referred to as the controller layer. The interface between the host and the controller may be referred to as a HCl (Host Controller Interface).

FIG. 2(b) illustrates an example of a BLE audio-related protocol stack. Unlike BR/EDR in which protocols are configured for each profile, in BLE, a common protocol stack for various profiles may be designed. This common protocol stack may be referred to as middleware. For example, a common protocol for various profiles such as hearing aids, high quality audio/music, voice recognition, and call/media in the form of middleware may be configured. For example, the middleware may include protocols such as device discovery, stream control (or stream management), codec, and legacy management. In addition, the core layer may include a link layer (Link Layer, LL), an LE Radio (i.e., a PHY layer), and the LL may include functions related to multicast support isochronous channels defined from Bluetooth 5.

In addition, the profile and middleware may be referred to as a host layer, the core layer may be referred to as a controller layer, and HCl may be defined between the host and the controller.

In addition to the host profile and protocol illustrated in FIG. 2(b), the host may include an LE profile, a generic access profile (GAP), a generic attribute profile (GATT), an Attribute (ATT) protocol, a security manager (SM), and the like.

Information transmitted from a host to a controller may be referred to as a HCl command packet. Information transmitted from a controller to a host may be referred to as a HCl event packet. In addition, HCl asynchronous data packets or HCl synchronous data packets may be exchanged between a host and a controller.

Also, in addition to the middleware profiles and services illustrated in FIG. 2(b), the middleware may include various profiles and/or services as follows:

Audio Session Capability Service (ASCS): Audio Session Capability Service (ASCS) is a service that supports to advertise or discover capabilities related to an audio session;

Audio Stream Session Service (Audio Stream Session Service, ASSS): Audio Stream Session Service (ASSS) is a service that supports discovery, setup, establishment, control, and management related to an audio session;

Audio Input Management Service (AIMS): a service for managing audio input volume, etc.;

Audio Routing Service (ARS): a service for selecting the location of audio inputs and outputs;

Audio Middleware Profile (AMP): a basic profile for the behavior of a device to distribute audio;

Call Management Profile (CMP): a profile of the roles and procedures of interaction between two devices for a call;

Audio General Middleware Profile (AGMP): a basic profile that enables content and/or stream control;

Group Identification Service (GIS): a service for the discovery of devices belonging to a group. A Group Identification Service (GIS) or Group Identification Profile (GIP) may allow devices to be discovered as part of a group. A group is defined as a group of devices that operate together to support a specific scenario, and these devices may be referred to as group members. For example, a group of devices that respond to a control command together, such as a pair of hearing aids, a pair of earbuds, or a set of speakers that receive multichannel (e.g., 5.1CH) audio, may be such examples:

Audio Player Management Profile (APMP): a profile that supports the control or interaction of an audio player;

Audio Player Management Service (APMS): a service that supports the control or interaction of an audio player;

Microphone Management Profile: a profile for microphone state management;

Microphone Management Service: a service that supports interfaces and states for microphone state management;

Quick Service Discovery Service (QSDS): a service that supports quick discovery of services such as audio player management and call management;

Call Bearer Service: a service that supports management of a call interface and a call state for a bearer on a device;

Volume Management Profile: a profile that supports audio volume management of a device;

Volume Management Service: a service that supports the device's audio volume interface and state;

Volume Offset Management Service: a service for volume management for audio output.

Figure 3:
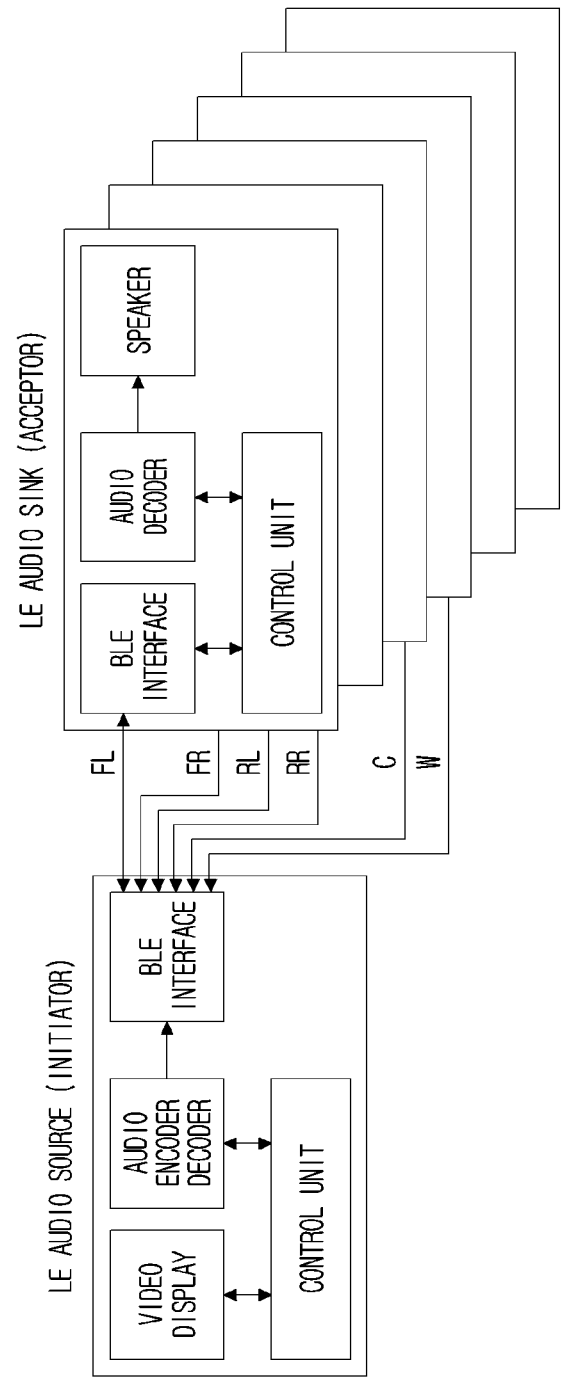
FIG. 3 is a diagram illustrating examples of 5.1 channel surround system hardware to which the present disclosure is applicable.

FIG. 3 illustrates examples of 5.1 channel surround system hardware to which the present disclosure is applicable.

In FIG. 3, a LE audio source device may perform a function of an initiator, and a LE audio sink device may perform a function of an acceptor. The initiator means a device that initiates an audio session, and the acceptor means a device that accepts the initiation of an audio session. Here, a source is not always the initiator or a sink is not always the acceptor, and the source may be the acceptor or the sink may be the initiator.

For example, an audio source may be a TV device, and an audio sink may be a speaker device. The audio source may transmit audio data to the audio sink. In addition, the audio source may receive feedback data from the audio sink. A plurality of audio sinks may receive audio data corresponding to one of 5.1 channels, respectively, FL (Front Left), FR (Front Right), RL (Rear Left), RR (Rear Right), C (Center), and W (Woofer) and output it through the speaker.

An audio encoder or decoder may support various audio formats. For example, the audio format may include Bluetooth Low Energy Audio Codec (BLEAC), Dolby 5.1CH, Digital Surround Sound (DTS), and the like, and the characteristics of each format are as follows. BLEAC is a mono codec, and the 96 kbps transmission rate of BLEAC may provide the same quality as 256 kbps of SBC (Sub-Band Codec) and 200 kbps of MP3. Dolby 5.1CH may support a 48 kHz sampling rate, support 1 to 5.1 (or 1 to 6) channels and support a transmission rate of up to 448 kbps. DTS may support 48 kHz or 96 kHz sampling rate, support 2 to 6.1 channels, and support transmission rates of 768 kbps half rate and 1,536 kbps full rate.

Figure 4A:
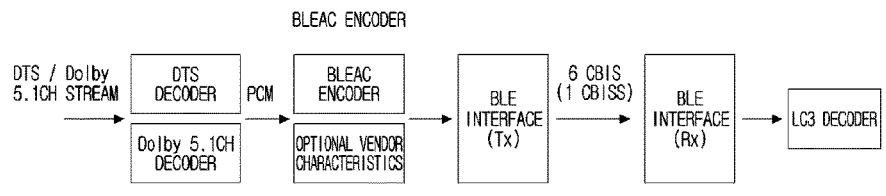
FIGS. 4(a)-4(c) are diagrams is a diagram illustrating an audio data encoding/decoding process to which the present disclosure is applicable.
Figure 4B:
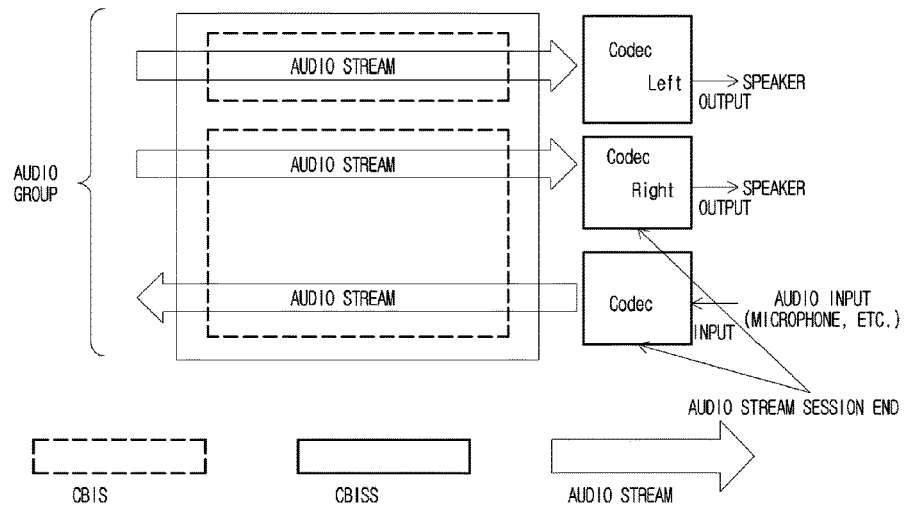
Figure 4C:
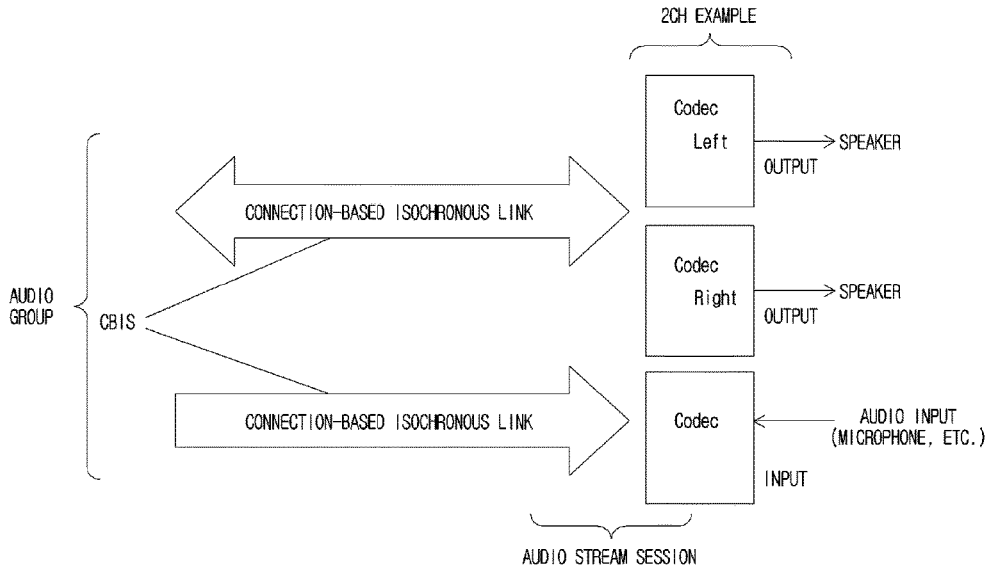

FIGS. 4(a)-4(c) are diagrams illustrating an audio data encoding/decoding process to which the present disclosure is applicable.

Referring to FIG. 4(a), a DTS format stream or a Dolby 5.1CH format stream may be input to a DTS decoder or a Dolby 5.1CH decoder of the transmitting end (Tx) and an audio signal in a PCM (Pulse-Code Modulation) format may be output. The PCM signal may be input to the BLEAC encoder and output as an audio signal in the BLEAC format. Here, optional vendor-specific information may be added. The BLEAC signal may be transmitted to the BLE interface of the receiving end (Rx) through the BLE interface. The receiving end may process the BLEAC signal through the BLEAC decoder and convert it into a signal that can be output through the speaker.

Here, a plurality of streams may be transmitted from a transmitting end to a plurality of receiving ends. For example, each of the plurality of streams may include an audio signal corresponding to one channel among 5.1 CHs. The plurality of streams may be received at different times from the plurality of receiving ends, but have isochronous properties that require play or rendering at the same time, and these streams may be called CBIS (Connection Based Isochronous Stream). That is, six CBISs corresponding to 5.1CH may be transmitted from a transmitting end to a receiving end, and a set of these six CBISs may be referred to as one CBISS (Connection Based Isochronous Steam Set).

FIGS. 4(b) and 4(c) conceptually illustrates audio streaming through a plurality of streams. One or more audio streams may correspond to CBIS, and an audio group may correspond to CBISS. For example, one audio stream may correspond to one CBIS, and two or more audio streams may correspond to one CBIS. A plurality of CBISs may be included in one audio group or CBISS.

Figure 5:
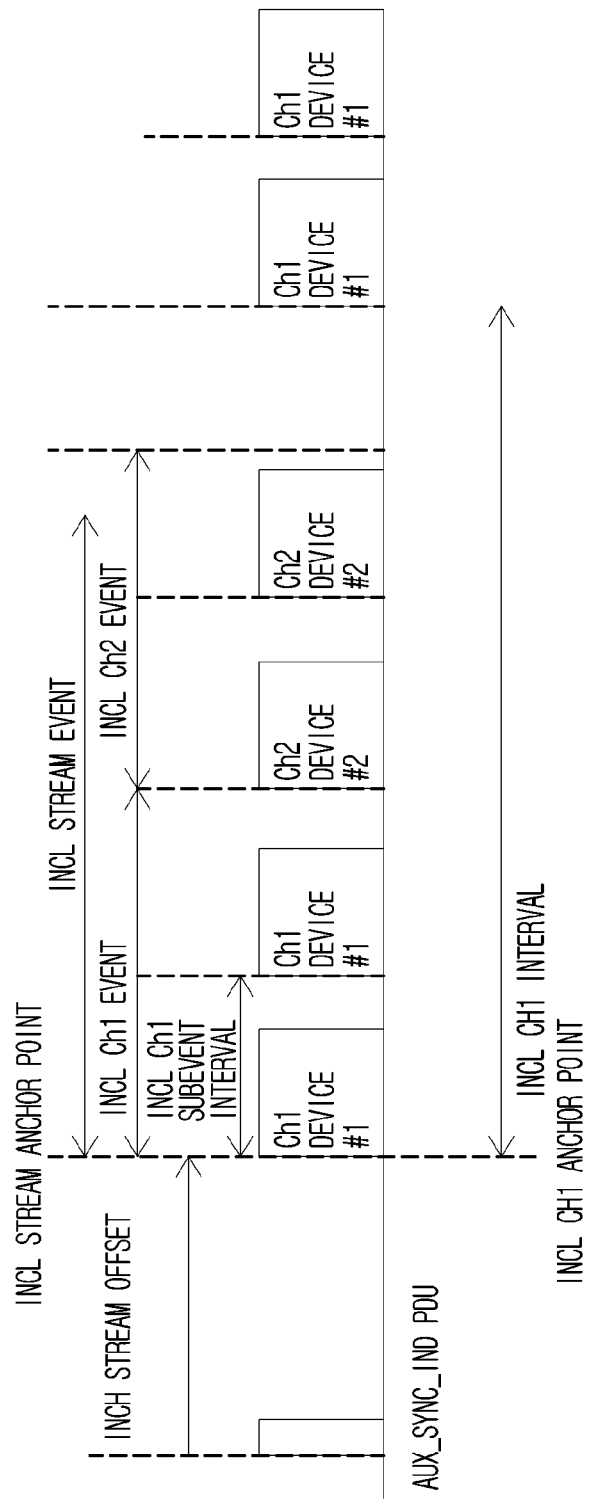
FIG. 5 is a diagram illustrating an example of channel allocation for two devices to which the present disclosure is applicable.

FIG. 5 is a diagram illustrating an example of channel allocation for two devices to which the present disclosure is applicable.

The receiving end may initiate stream reception according to timing information provided by the transmitting end. For example, the timing information may indicate a time point after a predetermined offset from a time point at which a data unit including the timing information is transmitted. The receiving end may receive audio data corresponding to one or more channels included in the stream. For example, a plurality of channels included in one stream may be allocated to a plurality of receiving ends, respectively. A plurality of channels (or a plurality of audio data) included in one stream may be transmitted in a time division multiplexing (TDM) method. For example, audio data of a first channel may be transmitted at a first timing, and audio data of a second channel may be transmitted at a second timing.

The broadcast receiving end may detect a currently obtainable broadcast audio stream, a stream offset value, a stream interval value, and the like, by using information included in a data unit periodically advertised by the transmitting end.

In the case of an Isochronous Non-Connection Link (INCL), which is a connectionless-based isochronous link, an isochronous channel may be transmitted/received (e.g., in a broadcast manner) without a connection between a source device and a sink device. From information such as BSG (Broadcast Synch Group) included in the AUX_SYNC_IND Protocol Data Unit (PDU) advertised by the transmitting end, the receiving end may check the INCL stream offset or BSG offset, and determine the anchor point timing. INCL stream transmission may start from the anchor point. A timing difference between two consecutive anchor points may be defined as an interval (e.g., an INCL CH1 interval or an ISO interval of FIG. 5). One or more sub-events may be included in the stream transmission event.

In the example of FIG. 5, one audio stream may include audio data for two channels. The first channel (CH1) may be allocated to the first device (device #1), and the second channel (CH2) may be allocated to the second device (device #2). At one or more timings after the anchor point, CH1 included in the INCL stream may be transmitted to the device #1, and thereafter, CH2 may be transmitted to the device #2 at one or more timings. In addition, the INCL stream event may include an event for CH1 and an event for CH2. An event for CH1 may include two sub-events. An event for CH2 may include two sub-events. A timing difference between sub-events may be defined as a sub-event interval.

Isochronous audio data may have a limited lifetime. That is, the audio data may be invalidated after the predetermined time has expired. For example, a predetermined timeout value may be defined in the ICL channel, and isochronous audio data transmitted to a plurality of devices may be discarded after the predetermined timeout value has expired. For example, a timeout may be expressed as a number of sub-events.

Figure 6:
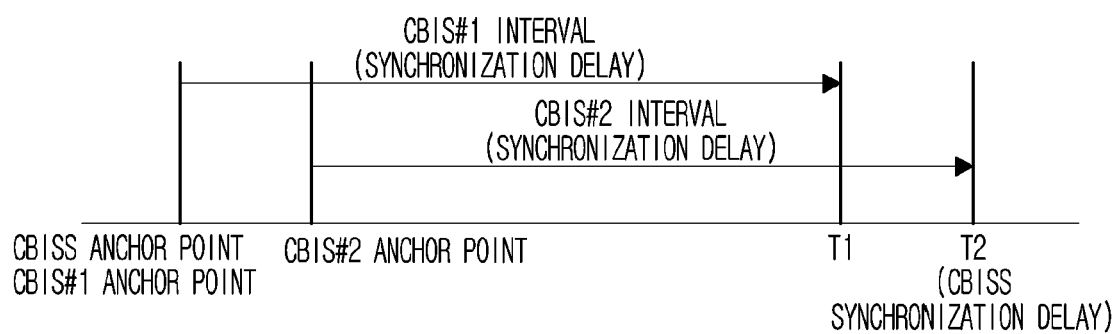
FIG. 6 is a diagram for describing a synchronization delay of two streams to which the present disclosure is applicable.

FIG. 6 is a diagram for describing a synchronization delay of two streams to which the present disclosure is applicable.

It is assumed that a plurality of streams are included in one audio group, and the plurality of streams have isochronism required to be reproduced at the same time. A plurality of streams may be transmitted from one device or may be transmitted from different devices. Also, the plurality of streams may be received by one device or may be received by different devices.

Since the Bluetooth communication method does not support simultaneous transmission of a plurality of streams, the plurality of streams may be transmitted in the TDM method on different time resources (or timings) according to a predetermined order. In this case, a difference may occur in the transmission timing of the plurality of streams, and accordingly, a difference may also occur in the reception timing of the plurality of streams. In addition, since a plurality of streams are required to be reproduced simultaneously, the stream received first cannot be reproduced first, but may be reproduced after waiting until the last stream is received. That is, a synchronization delay may occur until a timing at which reception of all streams is completed.

In the example of FIG. 6, the first stream (CBIS #1) and the second stream (CBIS #2) may be required to be reproduced simultaneously, and may be included in one CBISS. The CBISS anchor point may be same as the anchor point of CBIS #1, and after the CBIS #1 audio data may be transmitted, CBIS #1 audio data subsequent to the time point (e.g., T1) after the CBIS #1 interval may be transmitted. Next, after CBIS #2 audio data is transmitted from the anchor point of CBIS #2, CBIS #2 audio data subsequent to a time point after the CBIS #2 interval (e.g., T2) may be transmitted. After all streams included in one CBISS are received, they may be reproduced simultaneously. That is, the audio data of CBIS #1 and CBIS #2 may be processed and reproduced at the time of completion of reception of CBIS #2, which is transmitted relatively late.

Here, the synchronization delay of the CBISS may be defined as a time interval until the reception completion time (T2) of CBIS #2, which is received relatively late from the CBISS. For example, the later time point among the reception completion time T1 of CBIS #1 and the reception completion time T2 of CBIS #2 may be determined as the synchronization delay of the CBISS. That is, a later reception completion time among synchronization delays of a plurality of streams may be determined as a synchronization delay of the CBISS. Specifically, when CBIS #1 and CBIS #2 are bundled into the same single CBISS, the previously received stream CBIS #1 may be reproduced after waiting until the received stream CBIS #2 information is transmitted.

The transmitting end (Tx) may inform the receiving end (Rx) of an expected delay value calculated in consideration of the number of CBISs, CBIS events, sub-events, and intervals in advance. For example, the transmitting end may inform the receiving end of the expected delay value when configuring the channel.

In the case of a connection-based isochronous connection link (ICL), since the transmitting end and the receiving end are connected, the receiving end may inform the transmitting end of the actual delay value.

In the case of INCL, since the transmitting end and the receiving end are not connected, the receiving end cannot inform the transmitting end of the actual delay value. Even if the delay value may be informed from the receiving end to the transmitting end, the transmitting end cannot control the playback time of a specific device in order to synchronize the plurality of devices.

For example, even in the case of INCL, when a plurality of CBISs (e.g., six CBISs corresponding to six channels of 5.1CH) are included in one CBISS, the transmitting end may receive feedback from the receiver to adjust synchronization. Through the feedback, the receiving end may inform the transmitting end of its delay information.

Figure 7:
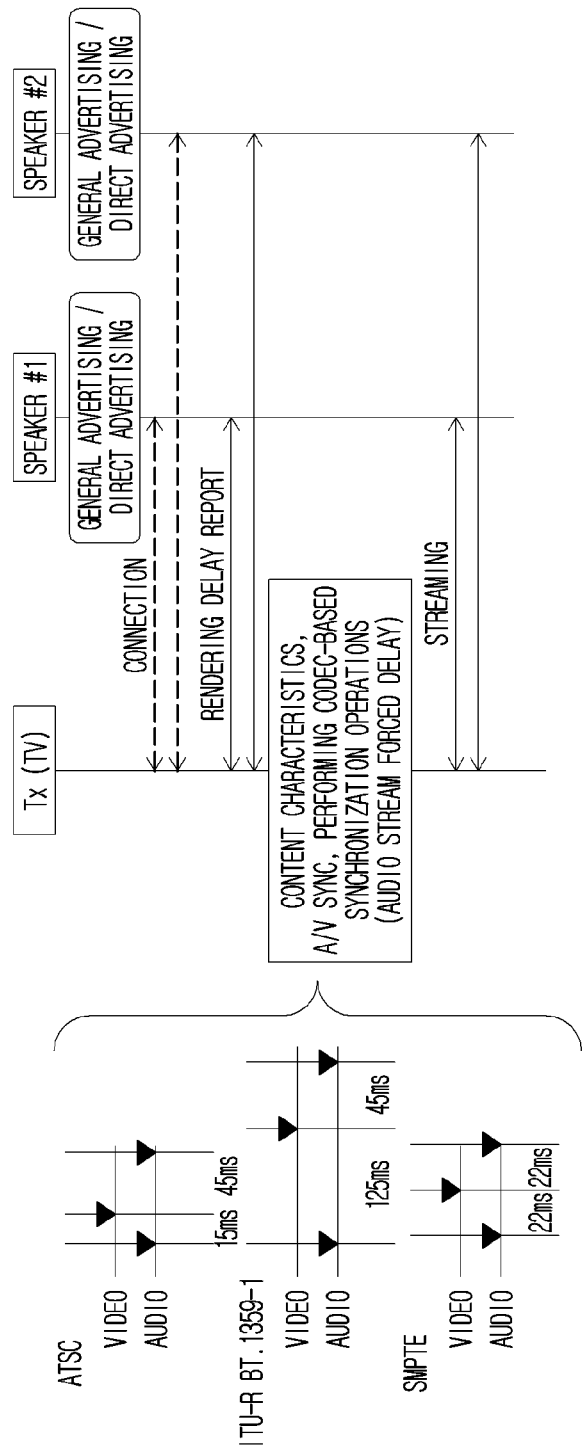
FIG. 7 is a diagram for describing a broadcast operation for a plurality of devices to which the present disclosure is applicable.

FIG. 7 is a diagram for describing a broadcast operation for a plurality of devices to which the present disclosure is applicable.

The audio source device may calculate a synchronization delay value for simultaneous reproduction of isochronous streams and transmit it to a plurality of audio sink devices. Each of the sink devices may determine the playback timing based on the delay value provided from the source device. That is, since the source device cannot accurately know the amount of time the sink device takes to receive and process audio data, the sink device may provide the delay value as basic information for determining the playback timing. The sink device may determine a reproduction timing according to its device characteristics and reproduce audio data.

For example, in an Isochronous Broadcast operation, a source device (e.g., a TV) may calculate a transmission delay, a rendering delay, etc., and transmit to a sink device (e.g., speaker). The sink device may adjust playback or rendering timing of audio data by reflecting the received delay value. Since device characteristics are different for each sink device manufacturer, the actual playback timing may be determined by the sink device.

If the sink device can transmit information to the source device, the sink, the sink device may calculate a delay value and transmit to the source device. Accordingly, the source device may determine the transmission timing based on the delay value provided from the sink device.

For example, a feedback channel may be formed through which a sink device (e.g., a speaker) may communicate information to a source device (e.g., a TV). In this case, a unicast operation based on an isochronous connection may be performed. The sink device may calculate a rendering delay value and transmit it to the source device through a feedback channel. Accordingly, the source device may adjust the transmission time of the audio data by reflecting the delay value provided from the sink device.

Referring to FIG. 7, an isochronous stream operation is exemplarily illustrated in the case where a transmitting end is a TV, and two receiving ends are a first speaker (speaker #1) and a second speaker (speaker #2). The first speaker may be allocated a first stream/channel (e.g., RR channel in 5.1CH), and the second speaker may be allocated a second stream/channel (e.g., RL channel in 5.1CH).

The first and second speakers may transmit an audio general advertisement or an audio directed advertisement, respectively. At least one of the TV and the first speaker or the second speaker may or may not be connected to each other.

When at least one of the TV and the speaker is connected, the speaker may calculate a rendering delay value and report it to the TV. When the TV and the speaker are not connected, the TV may calculate the transmission delay, rendering delay value, and the like, and send it to the speaker.

The TV may perform a synchronization operation in consideration of audio content characteristics, audio/video synch, codec characteristics, and the like, and forcibly apply a delay to a specific audio stream. For example, since the audio codec encoding/decoding delay is different from 40 ms for BLEAC, 200 ms for SBC, 100 ms for APT-X, etc., the delay value may be determined according to codec characteristics. In addition, since characteristics of A/V content are different according to games, movies, animations, and the like, a delay value may be determined in consideration of this. Also, a delay value may be determined in consideration of a difference between a media clock and a clock of the BLE interface. The media clock may be confirmed through A/V time scale information.

In addition, as shown on the left side of FIG. 7, a delay value may be determined in consideration of audio/video signal processing time defined in various broadcasting standards. For example, the time interval between audio-video-audio is 15 ms and 45 ms in Advanced Television Systems Committee (ATSC), 125 ms and 45 ms in ITU-R BT.1359-1, and SMPTE (Society of Motion Picture and Television Engineers) It is defined as 22 ms and 22 ms, and a delay value may be determined in consideration of these time intervals.

The TV may configure the rendering delay value of each stream and inform the speaker, or determine the transmission timing of the stream based on the delay value provided from the speaker.

The TV may transmit a stream to the speaker based on the determined delay value. That is, the source device or the TV which is the transmitting end may exchange a delay value with the sink device and the speaker(s) which is the receiving end, and may perform an operation of synchronizing by reflecting the delay value.

Figure 8:
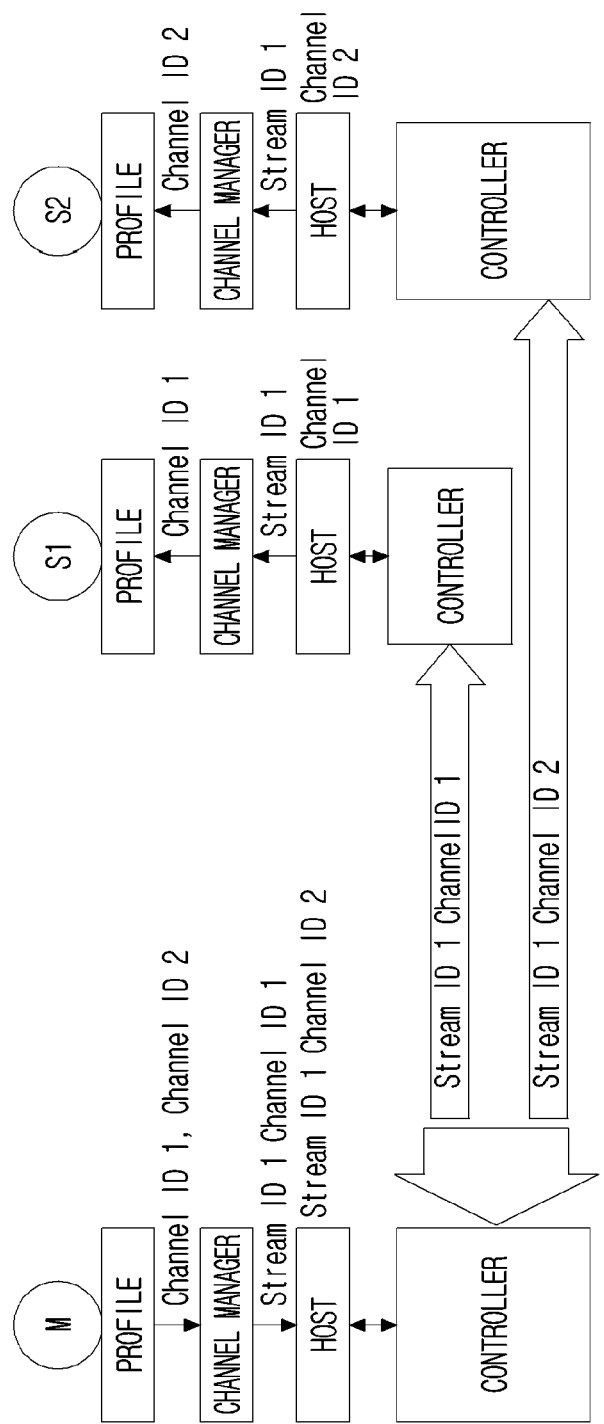
FIG. 8 and FIG. 9 are diagrams for describing the operation of the ICL type and the INCL type to which the present disclosure is applicable.
Figure 9:
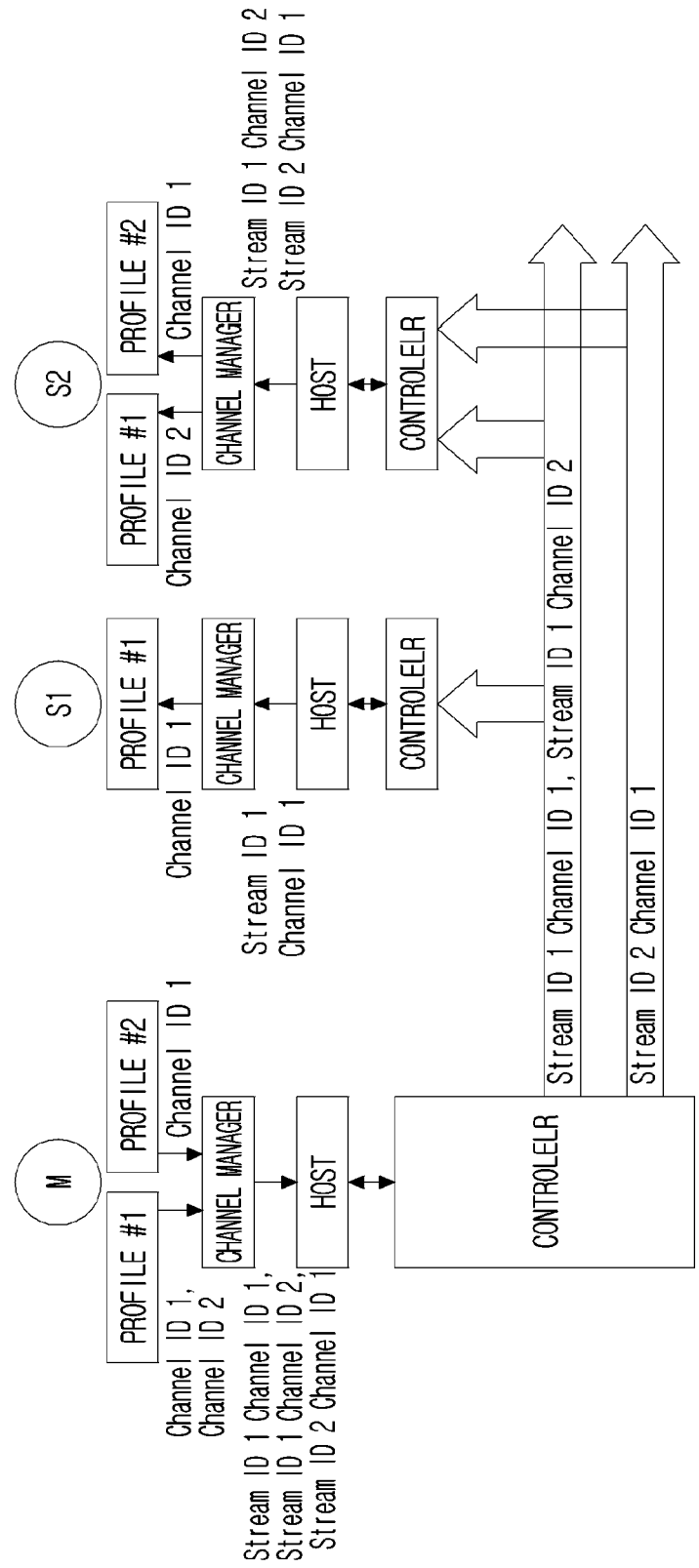

FIG. 8 and FIG. 9 are diagrams for describing the operation of a ICL type and a INCL type to which the present disclosure is applicable.

In BLE, a channel for audio transmission may be classified into an ICL type and an INCL type. Both the ICL channel and the INCL channel may transmit audio data to multiple devices and/or multiple profiles using a stream ID and a channel ID. According to the ICL type and the INCL type, it may be determined what operation is to be performed on the BLE channel for audio data transmission.

ICL channels correspond to a connection-based use case that supports unidirectional or bidirectional communication through a point-to-point physical link between one source device and one sink device. In addition, INCL channels correspond to a broadcast use case that supports only unidirectional communication through a point-to-multipoint physical link between one source device and one or more sink devices.

The protocol stack of the device may include a profile layer, a channel manager layer, a host layer, and a controller layer in order from an upper layer to a lower layer. Data may be transferred between the profile layer and the channel manager layer in units of channels, and data may be transferred between the channel manager layer and the host layer in units of streams.

Referring to FIG. 8, in case of the ICL type, a connection between a master (M) and the first slave S1 and a connection between the master M and the second slave S2. In this case, it is possible to divide two channels included in one stream by a channel identifier and transmit to the two slaves. That is, channel ID 1 may be allocated to the S1 and channel ID 2 may be allocated to the S2. Both the channel ID 1 and the Channel ID 2 may be transmitted through the same stream ID 1. In addition, since bidirectional communication is possible based on the connection, the slaves may provide feedback information to the master M. For example, when S1 is a wireless earphone mounted on the right ear and S2 is a wireless earphone mounted on the left ear, it is possible to listen to music transmitted by the master M in stereo through S1 and S2.

Referring to FIG. 9, in the case of the INCL type, there is no connection between the master M and the slaves (S1, S2), and the slaves may synchronize with a INCL stream offset, an event, a timing of the sub-event based on the synchronization information advertised by the master and may receive broadcast audio data. In addition, the master M may include two profiles (profile #1 and profile #2). The first slave S1 may include the profile #1, and the second slave S2 may include the profile #1 and the profile #2. In Profile #1, the channel ID 1 and the channel ID 2 may be broadcast from the master M through one stream, Stream ID 1, and it is similar to FIG. 8 that the slaves S1 and S2 respectively receive the channel ID 1 and the channel ID in Profile #1. Additionally, in profile #2, the channel ID 1 may be broadcast from the master M through Stream ID 2, and the second slave S2 may receive Channel ID 1 in profile #2.

Figure 10:
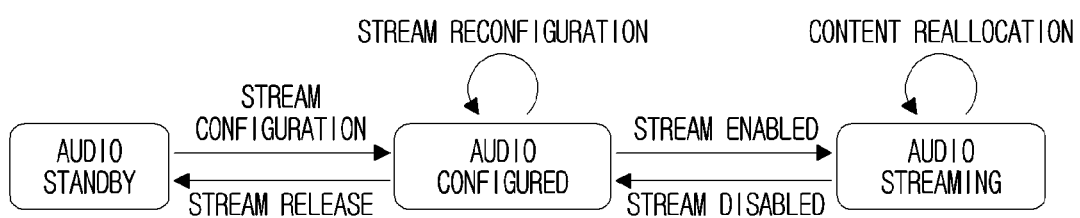
FIG. 10 is a diagram illustrating a broadcast audio stream state machine to which the present disclosure is applicable.

FIG. 10 is a diagram illustrating a broadcast audio stream state machine to which the present disclosure is applicable.

The control of the broadcast audio stream may be described as a broadcast audio stream state machine and state transition at the broadcast transmitting end.

The broadcast audio stream state machine may allow a broadcast transmitter to communicate with one or more broadcast receivers (or broadcast discovery clients) in a one-way manner without a connection or not with a broadcast receiver (or broadcast discovery client). The broadcast transmitter may communicate using a broadcast audio advertisement in the form of a Broadcast Audio Source Session (BASS). A broadcast audio stream may be transmitted by a broadcast transmitter.

The AUDIO STANDBY state means state in which a broadcast audio stream is not transmitted.

The AUDIO CONFIGURED state means a state in which a broadcast receiver (or a broadcast discovery initiator) starts advertising information for detecting an audio stream through a periodic advertising event. The periodic advertising event may include delivering advertisement metadata, stream configuration, synchronization information, and the like. In this state, no audio data packet is transmitted from the broadcast transmitter.

The AUDIO STREAMING state means a state in which a broadcast audio stream is enabled in a broadcast transmitter and an audio data packet may be transmitted. The broadcast transmitter may continuously perform metadata advertising through periodic advertising while transmitting the broadcast audio stream. If a stream is configured in the AUDIO STANDBY state, it may transition to the AUDIO CONFIGURED state, and if the stream is released in the AUDIO CONFIGURED state, it may transition to the AUDIO STANDBY state. If a stream is enabled in the AUDIO CONFIGURED state, it may transition to the AUDIO STREAMING state, and if the stream is disabled in the AUDIO STREAMING state, it may transition to the AUDIO CONFIGURED state. If a stream reconfiguration occurs in the AUDIO CONFIGURED state, it may transition to the AUDIO CONFIGURED state. When content reassignment occurs in the AUDIO STREAMING state, it may transition to the AUDIO STREAMING state.

Figure 11:
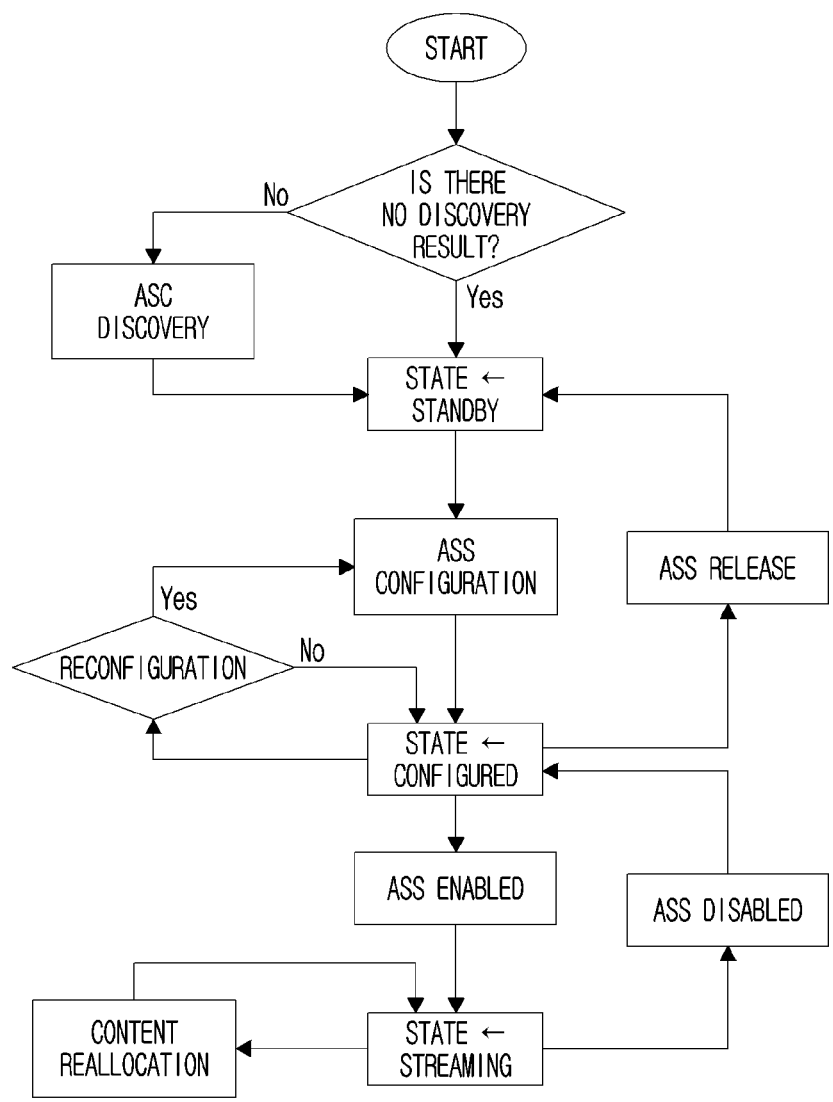
FIG. 11 is a diagram illustrating an audio setup procedure to which the present disclosure is applicable.

FIG. 11 is a diagram illustrating an audio setup procedure to which the present disclosure is applicable.

When there is no discovery result (that is, zero discovery), the AUDIO STANDBY state may be transitioned, and if there is a discovery result, discovery for Audio Stream Capability (ASC) may be performed and transition to the AUDIO STANDBY state.

When an ASS (Audio Stream Session) configuration occurs, it may transition to the AUDIO CONFIGURED state. If ASS is released in the AUDIO CONFIGURED state, it may transition to the AUDIO STANDBY state. When reconfiguration occurs in the AUDIO CONFIGURED state, it may transition to the AUDIO CONFIGURED state through the ASS configuration.

When ASS is activated, it may transition to AUDIO STREAMING state. If ASS deactivation occurs in the AUDIO STREAMING state, it may transition to the AUDIO CONFIGURED state. If content reassignment occurs in the AUDIO STREAMING state, it may transition to the AUDIO STREAMING state.

Figure 12:
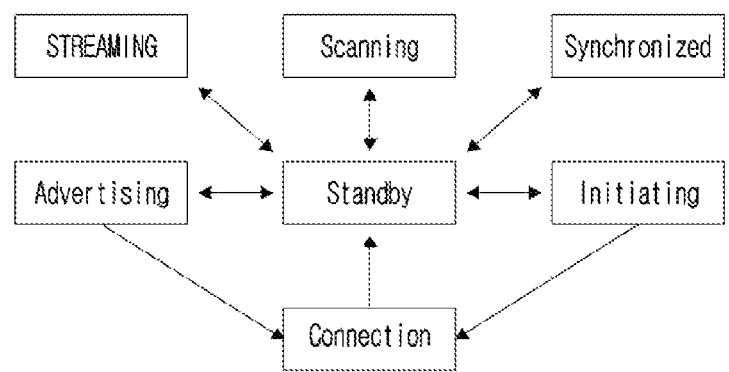
FIG. 12 is a diagram illustrating a link layer state machine to which the present disclosure is applicable.

FIG. 12 is a diagram illustrating a link layer state machine to which the present disclosure is applicable.

The operation of the link layer LL may be expressed as (in terms of an isochronous channel) Standby state, Advertising state, Scanning state, Initiating state, Connection state, Synchronized (synchronization) state, and Streaming (Isochronous Broadcasting) state.

The Standby state corresponds to a standby state before transitioning to another state.

In the Advertising state, the LL may operate as a advertiser transmitting an advertising packet. When a connection is established in the advertising state, the device may operate as a slave.

In the Initiating state, the LL may act as an initiator that listens for packets from other advertisers and initiates a connection in response to the packets. When a connection is established in the initiating state, the device may operate as a master.

In the Scanning state, the LL may act as a scanner that listens for packets from other advertisers and requests additional information.

The synchronized state may refer to a state in which an audio stream may be received or received in synchronization with another device.

The streaming state may refer to a state in which an audio stream is transmitted to another synchronized device.

Figure 13:
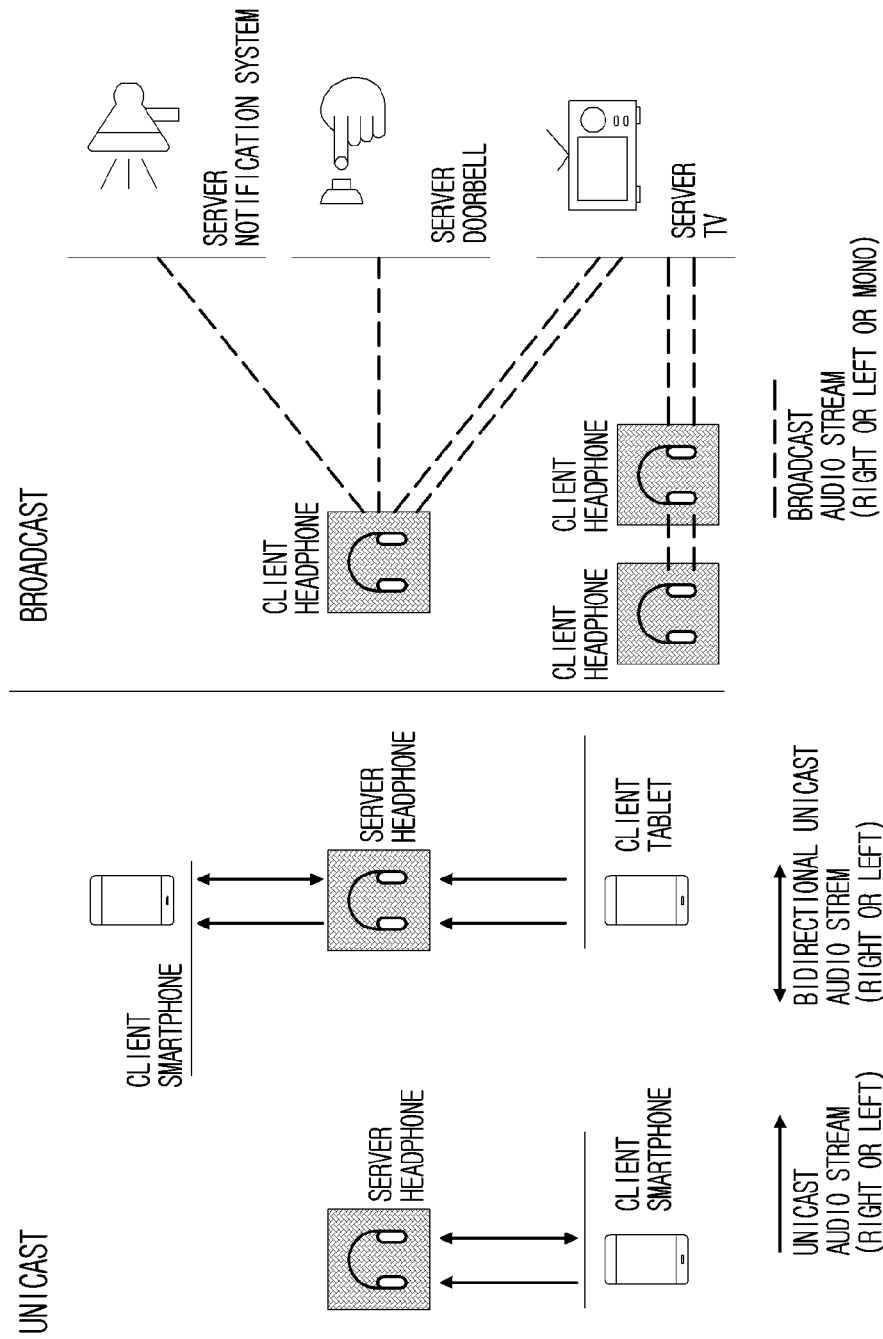
FIG. 13 is a diagram illustrating an example of an audio topology to which the present disclosure is applicable.

FIG. 13 is a diagram illustrating an audio topology to which the present disclosure is applicable.

In the case of unicast, unidirectional or bidirectional audio streams may be supported. Unicast audio data transmission/reception based on a connection between a headset and a smartphone may be performed, and the unicast audio data transmission/reception based on a connection between a headset and a smartphone and a connection between the headset and a tablet may be performed. In this case, the server of the unicast audio service may be a headphone, and the client may be a smartphone or tablet. Also, headphones may correspond to an audio sink, and a smartphone or tablet may correspond to an audio source.

In the case of broadcast, a notification system, a doorbell, a TV, etc. may transmit audio data in a broadcast manner, and one or more devices may receive the broadcast audio data. In this case, the server of the broadcast audio service may be a notification system, a doorbell, a TV, or the like, and the client may be a headphone. Also, the headphones may correspond to an audio sink, and a notification system, a doorbell, and a TV may correspond to an audio source.

FIG. 14(a) to FIG. 16(b) are diagrams illustrating a message exchange procedure between a server and a client to which the present disclosure is applicable.

In the example of FIG. 14(a) to FIG. 16(b), the client may be an audio source and the server may be an audio sink. Or, the client may be an audio sink and the server may be an audio source.

Figure 14A:
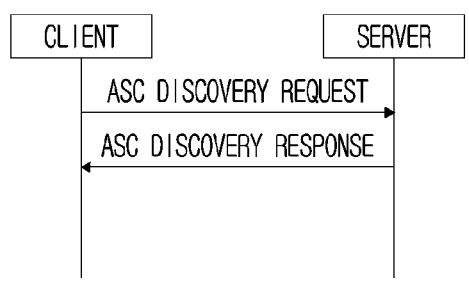
Figure 14B:
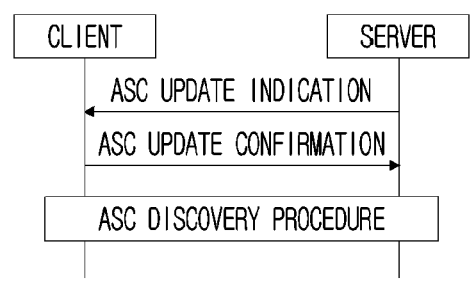

FIGS. 14(a) and 14(b) exemplarily illustrates an audio session capability (ASC) discovery procedure and an ASC update procedure.

In the audio session capability discovery procedure of FIG. 14(a), the client may request capability discovery by transmitting an ASC discovery request message to the server, and in response to that, the server may transmit detailed information of the capability by transmitting an ASC discovery response message to the client.

In the audio session capability update procedure of FIG. 14(b), the server may transmit an ASC update indication message to the client to inform that the capability update has occurred, and the client may notify the server to perform a capability update by transmitting an ASC update confirmation message. Subsequently, an audio session capability discovery procedure or an ASC discovery procedure may be performed.

The format of the message used in the example of FIG. 14 may be defined as shown in Table 1 below.

TABLE 1

ASC_DISCOVERY REQUEST
Direction
ASC_DISCOVERY RESPONSE
Sink Locations : Bitmap
Source Locations : Bitmap
Number of ASC Records
Direction
Codec ID
Sampling Frequency
Codec Specific
Content Protection Type
Content Protection type Specific The ASC update indication message and the ASC update confirmation message may include information indicating that ASC discovery is required and confirmation information therefor, respectively.

Figure 15B:
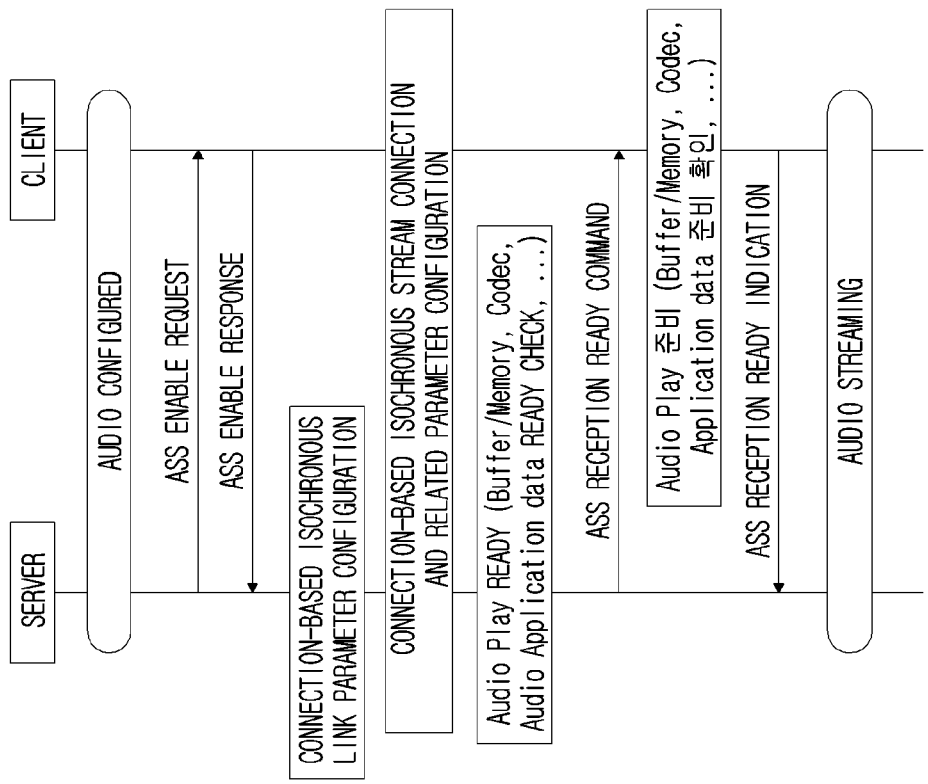
Figure 15A:
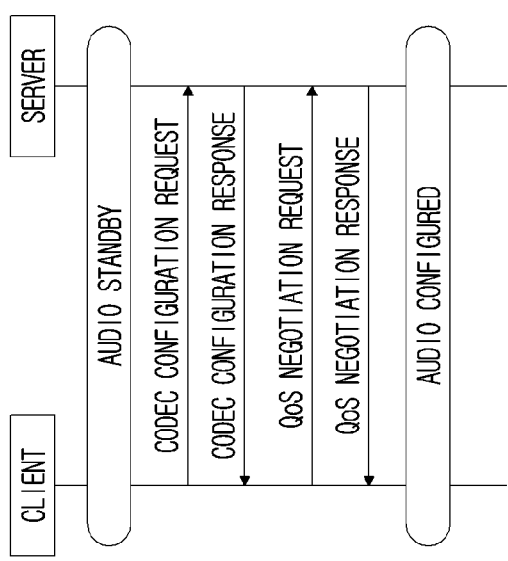

FIGS. 15(a) and 15(b) exemplarily illustrate a unicast audio stream configuration procedure and an unicast audio stream establishment procedure.

In the unicast audio stream configuration procedure of FIG. 15(a), the client, in the AUDIO STANDBY state, may transmit a Codec configuration request message to the server to inform the server of the codec requesting configuration, and the like. In response, the server may transmit a codec configuration response message to the client to inform the server of QoS and rendering delay values supported by the server. In addition, the client may transmit a QoS negotiation request message to the server to specify a specific audio stream session (ASS), an audio group, and an audio stream to inform the client of QoS and rendering delay values supported by the client. In response, the server may transmit a QoS negotiation response message to the client. Accordingly, bandwidth (BW), bitrate, etc. may be determined by negotiation between the client and the server, and the client and the server may transition to a CONFIGURED state.

In the unicast audio stream establishment procedure of FIG. 15(b), the client may transmit an ASS enable request message to the server in the AUDIO CONFIGURED state to inform information on the ASS requesting activation. In response, the server may transmit an ASS enable response message to the client to inform about which ASS to activate. Configuration for connection-based isochronous link parameters may be performed at the client, and CBIS may be established by the client and the server configuring the connection-based isochronous stream connection and related parameters. If the client is the audio sink and the server is the audio source, the server may prepare to play audio data and transmit an ASS Rx ready indication message to the client, and the client may prepare to provide audio data after receiving the ASS reception ready indication notification message. Accordingly, the client and the server may transition to the AUDIO STREAMING state.

The format of the message used in the example of FIGS. 15(a) and 15(b) may be defined as shown in table 2 below.

TABLE 2

Figures 16A, 16B:
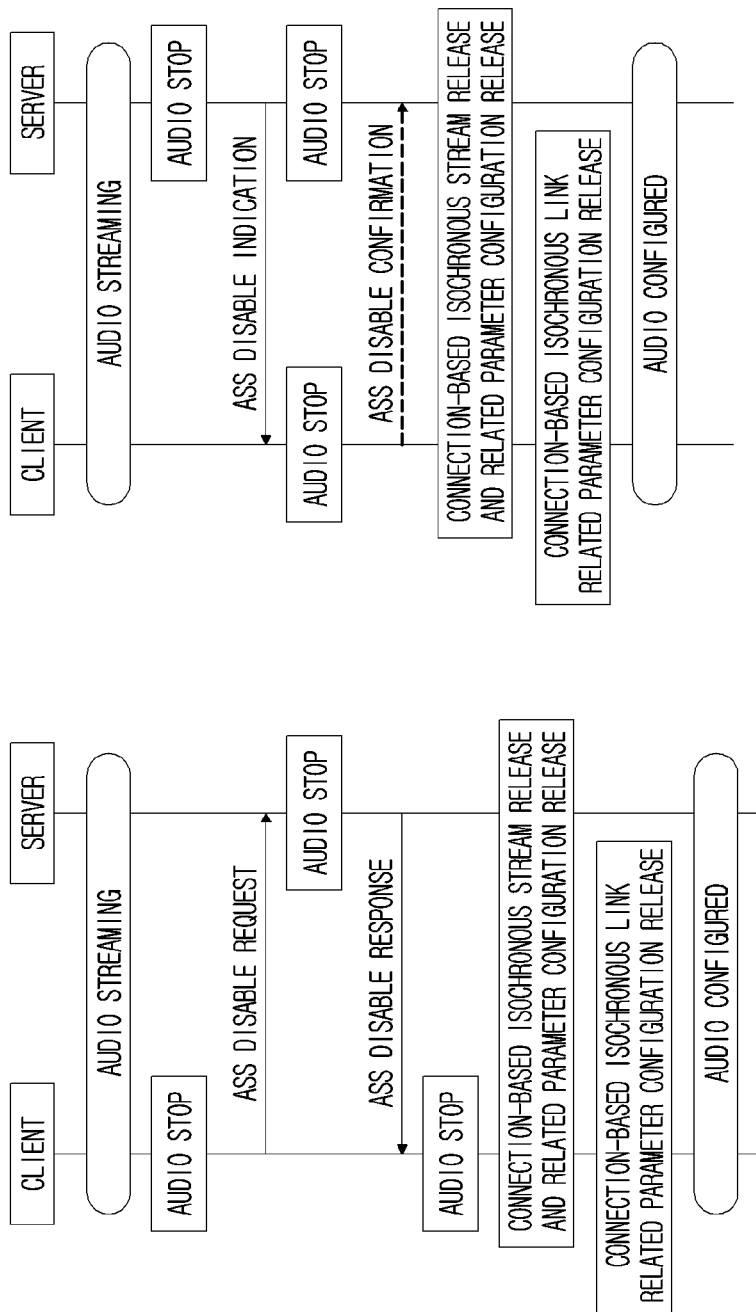

CODEC CONFIGURATION REQUEST
ASS ID
ASA ID
Direction
Codec ID
Sampling Frequency
Codec Specific
CODEC CONFIGURATION RESPONSE
ASS ID
Server ssupported QoS (Interleaved, Framed, Transport Latency)
Presentation delay
QOS NEGOTIATION REQUEST
ASS ID
CBISS ID
CBIS ID
Cliet QoS (Transport Latency)
Rendering Delay
QOS NEGOTIATION RESPONSE
ASS ID
ASS ENABLE REQUEST / ASS ENABLE RESPONSE
Number of ASS ID
ASS ID
ASA ID
Content Type
ASS RX READY COMMAND / ASS RX READY NOTIFICATION
Number of ASS ID
ASS ID FIGS. 16(a) and 16(b) exemplarily illustrates a procedure for disabling an audio stream by a client and a procedure for disabling an audio stream by a server.

In the procedure of the client disable audio streams in FIG. 16(a), if the client is an audio source and the server is an audio sink, when the client decides to stop the audio in the AUDIO STREAMING state, an ASS disable request message may be transmitted to the server. Accordingly, the server may stop streaming audio data and transmit an ASS disable response message to the client. Upon receiving this, the client may stop audio data encoding and audio application operation.

Alternatively, if the client is an audio sink and the server is an audio source, the client may stop audio data streaming and transmit ASS disable request message to the client. Accordingly, the server may stop audio data encoding and audio application operation and transmit an ASS disable response message to the client.

After that, the client and the server may perform connection-based isochronous stream release and related parameter setting release. Here, in preparation for reconnection between the client and the server, device information may be stored in the client and/or the server together with an isochronous stream connection related parameter. Accordingly, the client may release the connection-based isochronous link related parameter setting. Accordingly, the client and the server may transition to the AUDIO CONFIGURED state.

In the example of FIG. 16(b), in the procedure of disabling audio streams by the server, if the server is an audio source and the client is an audio sink, when the server decides to stop audio in the AUDIO STREAMING state, an ASS disable indication message may be transmitted to the client. Accordingly, the client may stop streaming audio data and may or may not transmit an ASS disable confirmation message to the server. The server may stop encoding audio data and audio application operation with or without receiving an ASS deactivation response.

Alternatively, if the server is an audio sink and the client is an audio source, the server may stop audio data streaming and transmit an ASS disable indication message to the client. Accordingly, the client may stop the audio data encoding and audio application operation, and may or may not transmit an ASS disable confirmation message to the server.

After that, the client and the server may perform connection-based isochronous stream release and related parameter configuration release. Here, in preparation for reconnection between the client and the server, device information may be stored in the client and/or the server together with an isochronous stream connection related parameter. Accordingly, the client may release the connection-based isochronous link related parameter configuration. Accordingly, the client and the server may transition to the AUDIO CONFIGURED state.

The format of the message used in the example of FIGS. 16(a) and 16(b) may be defined as shown in table 3 below.

TABLE 3

ASS DISABLE REQUEST / ASS DISABLE RESPONSE /
ASS DISABLE INDICATION
Number of ASS ID
ASS ID
(No Contents)

Table 4 below exemplarily shows content reallocation request/response, ASS release request/response, general advertisement, and directed advertisement message formats.

TABLE 4

Figure 17:
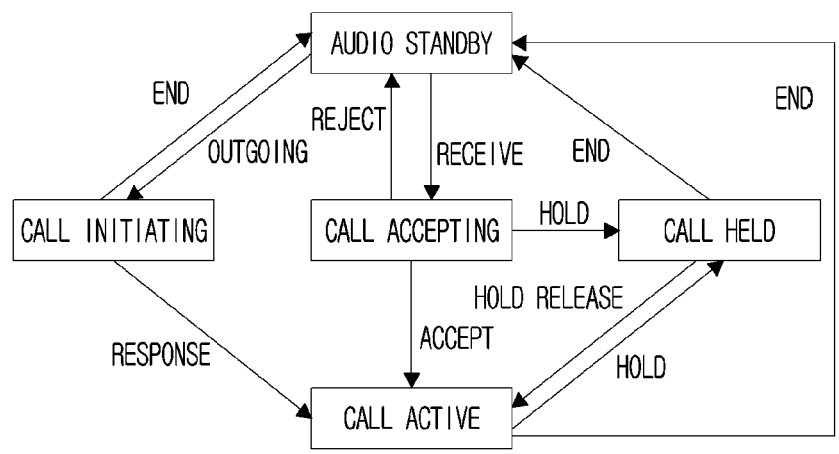
FIG. 17 is a diagram illustrating state machine for a call service to which the present disclosure is applicable.

REASSIGN CONTENT REQUEST / REASSIGN CONTENT RESPONSE
Number of ASS ID
ASS ID
ASA ID
Content Type
ASS RELEASE REQUEST / ASS RELEASE RESPONSE
ASS ID
GENERAL ADVERTISEMENT
DIRECTED ADVERTISEMENT
Content Type
Meta data FIG. 17 is a diagram illustrating a state machine for a call service to which the present disclosure is applicable.

When a call is received in the AUDIO STANDBY state, it may transition to the CALL ACCEPTING state. When a call is accepted in the CALL ACCEPTING state, it may transition to the CALL ACTIVE state. When a call is rejected in the CALL ACCEPTING state, it may transition to the AUDIO STANDBY state. In the case of hold in which a call cannot be received in the CALL ACCEPTING state, it may transition to the CALL HELD state, and may transition to the CALL ACTIVE state when the hold is released in the CALL HELD state. When the CALL HELD state or the CALL ACTIVE state is terminated, it may transition to the AUDIO STANDBY state.

Also, When a call is outgoing in the AUDIO STANDBY state, it may transition to the CALL INITIATING state. When it answers a call from a remote location or the other party in the CALL INITIATING state, it may transition to the CALL ACTIVE state. When it ends in the CALL INITIATING state, it may transition to the AUDIO STANDBY state.

In such a call service state machine, audio data that needs to be delivered to the headset in the AUDIO STANDBY state may occur. For example, audio data may be transmitted to the headset when a response when a phone number is dialed is notified by sound.

Alternatively, information definitively indicating various wireless access technology (e.g., 2G, 3G, 4G, 5G, Wi-Fi, GSM, CDMA, WCDMA, etc.) related to the call service. For example, For example, a bearer technology field having a size of 1 octet may be defined. This may be related to the aforementioned call bearer service.

In the case of multiway calling, a plurality of lines may exist, and a state machine as shown in FIG. 17 may be maintained for each line. For example, when the second line transitions from the AUDIO STANDBY state to the CALL ACCEPTING state while the first line is in the CALL ACTIVE state, the first or the second line may transition to the CALL HELD state according to the user's control.

Hereinafter, logical links of Bluetooth system and logical transports will be described.

A variety of logical links may be used to support different application data transfer requirements. Each logical link is associated with a logical transport, which may have various characteristics. These characteristics may include flow control, acknowledgment/repeat mechanisms, sequence numbering and scheduling operations, and the like. A logical transport may carry various types of logical links depending on its type. A plurality of logical links may be multiplexed into the same single logical transport. A logical transport may be carried by a physical link on a particular channel.

Logical transport identification and real-time (link control) signaling may be included in the packet header, and specific logical link identification may be included in the header of the payload.

Table 5 below exemplarily illustrates logical transport types, supported logical link types, supported physical link and physical channel types, and descriptions of logical transports.

TABLE 5

| Logical transport | Links supported | Supported by | Bearer | Overview |
|---|---|---|---|---|
| Connection based Isochronous Stream | Stream (framed or unframed) LE-S or LE-F | LE isochronous physical link | LE | Unidirectional or bidirectional transport in a point-to-point connection for transferring isochronous data. |
| Broadcast Isochronous Stream | Stream (framed or unframed) LE-S (or LE-F) and Control (LEB-C) | LE isochronous physical link | LE | Unidirectional transport for broadcasting data in a point to multipoint configuration and unidirectional transport for controlling the broadcast data |

FIGS. 18(a)-18(d) are diagram is a diagram illustrating a packet format for each layer to which the present disclosure is applicable.

Figures 18A, 18B, 18C, 18D:
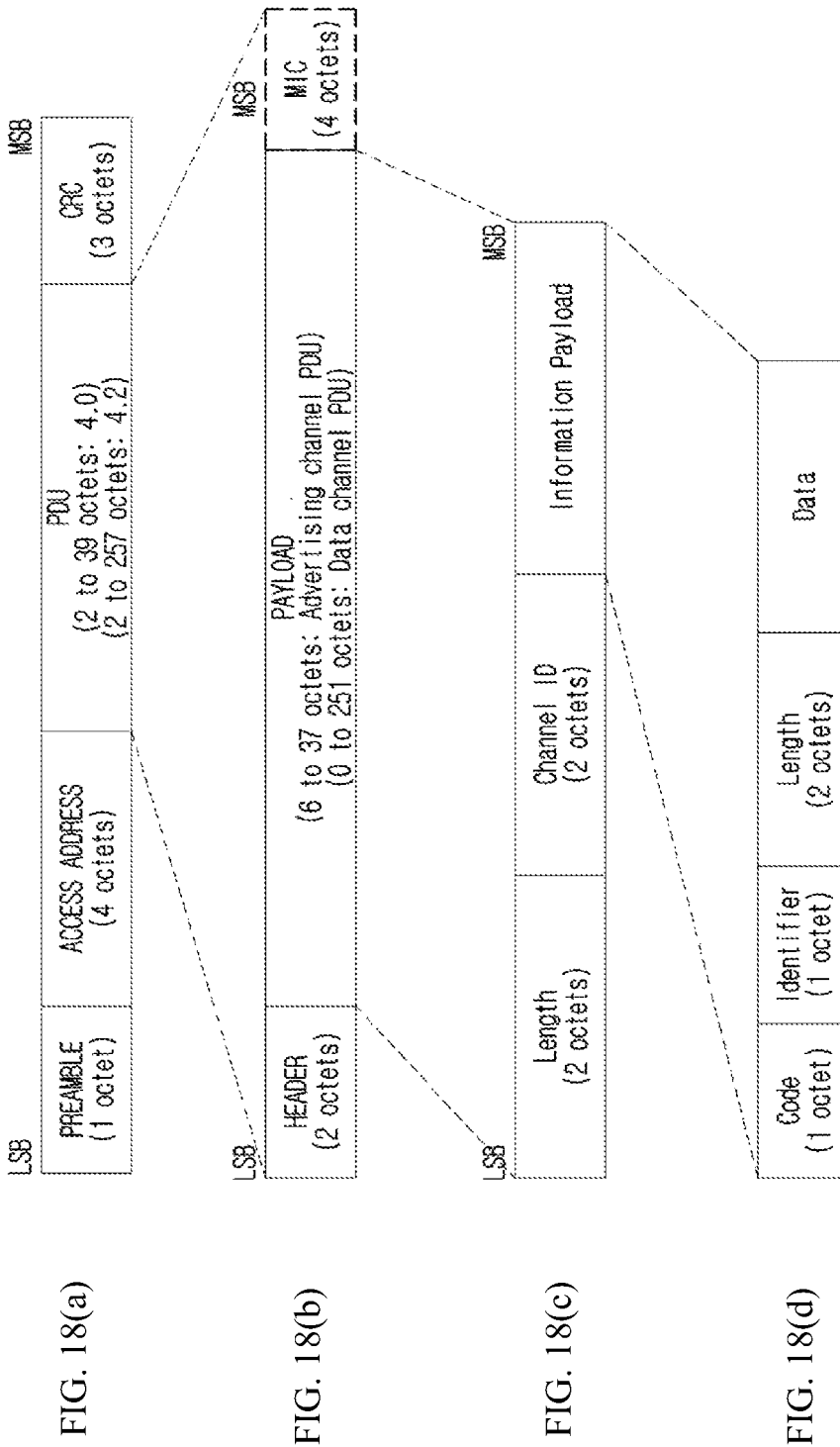
FIGS. 18(a)-18(d) are diagrams illustrating a packet format for each layer to which the present disclosure is applicable.

FIG. 18(a) illustrates an example of link layer (LL) packet format. The LL packet format may include a preamble, an access address (or an access code), a PDU, and a Cyclic Redundancy Code (CRC) field. The preamble may have a size of 1 octet, may be used for frequency synchronization, symbol timing estimation, automatic gain control (AGC) training, and the like at the receiving side, and may be configured with a predetermined bit sequence. The access address may have a size of 4 octets and may be used as a correlation code for a physical channel. A PDU may be defined with a size of 2 to 39 octets in Bluetooth 4.0 version, and may be defined as a size of 2 to 257 octets in version 4.2. The CRC may include a value calculated as a 24-bit long checksum for the PDU.

FIG. 18(b) illustrates an exemplary format of the PDU of FIG. 18(a). PDU may be defined in two types, one is a data channel PDU (Data channel PDU), the other is an advertising channel PDU (Advertising channel PDU). The data channel PDU will be described in detail with reference to FIGS. 19(a)-19(d), and the advertising channel PDU will be described in detail with reference to FIGS. 20(a)-20(d).

FIG. 18(c) illustrates an example of an L2CAP PDU format, which may correspond to an exemplary format of the payload field of FIG. 18(b). The L2CAP PDU may include a Length, a Channel ID, and an Information Payload field. The length field may indicate the size of the information payload, and the information payload field may include higher layer data. The channel identifier field may indicate which upper layer data the information payload field includes. For example, if the value of the channel identifier field is 0x0004, it may indicate ATT (ATTribute protocol), if the value of the channel identifier field is 0x0004, it may indicate SMP (Security Manager Protocol), or another channel identifier indicating a different type of upper layer or middleware Values may be defined and used.

When the L2CAP packet of FIG. 18(c) is an L2CAP PDU (i.e., a control frame) transmitted on a signaling channel, the information payload field of FIG. 18(c) may be configured as shown in FIG. 18(d). The information payload field may include a code (Code), an identifier (Identifier), a length (Length) and data (Data) fields. For example, the code field may indicate the type of the L2CAP signaling message. The identifier field may include a value that matches the request and the response. The length field may indicate the size of the data field. Data fields may contain attributes. An attribute is a unit of arbitrary data, and may include, for example, data at various points in time in various states of the device, such as location, size, weight, temperature, and speed.

An attribute may have a format including an attribute type, an attribute handle, an attribute value, and an attribute permission.

The attribute type may include a value indicating the type of attribute data identified by a Universally Unique Identifier (UUID).

The attribute handle may contain a value assigned by the server to identify attribute data.

The attribute value may include the value of attribute data.

Attribute permission may be configured by GATT (Generic ATTribute profile), and may include a value indicating the type of allowed access (e.g., whether it can read/write, whether encryption is required, whether authentication is required, whether authorization is required, etc.) to the corresponding attribute data.

In point of view of an Attribute protocol (ATT)/Generic Attribute Profile (GATT), a device may serve as a server and/or a client. The server may serve to provide attributes and related values, and the client may play a role of discovering, reading, or writing attributes on the server.

In ATT/GATT, it may support the transmission and reception of attribute data between the server and the client. For this, the PDU supported by the ATT protocol may include six method types, that is, request, response, command, notification, indication, and confirmation.

A request is sent from the client to the server, and a response from the server is required. A response is sent from the server to the client, and is sent when there is a request from the client. A command is sent from the client to the server, and no response is required. A notification is sent from the server to the client, and confirmation is not required. An indication is sent from the server to the client, and confirmation of the client is required. A confirmation is sent from the client to the server, and is sent when there is an instruction from the server.

In addition, GATT may support various profiles. The structure of the GATT-based profile may be described as a service (service) and characteristics (characteristics). A device may support one or more profiles. One profile may include zero or one or more services. A plurality of profiles may use the same service. One service may include one or more characteristics. A characteristic means a data value that is the subject of read, write, indicate, or notify. That is, a service may be understood as a data structure used to describe a specific function or feature, and a service that is a combination of characteristics may indicate an operation performed by a device. All services are implemented by the server and may be accessed by one or more clients.

FIG. 19 is a diagram illustrating examples of a data unit format to which the present disclosure is applicable.

FIG. 19(a) illustrates an exemplary format of a data physical channel PDU (Protocol Data Unit). The data channel PDU may be used to transmit a packet on the data physical channel (e.g., channel number 0 to 36). The data physical channel PDU includes a 16 or 24 bit length header and a variable size (e.g., 0 to 251 octet size) payload, and may further include a Message Integrity Check (MIC) field. For example, the MIC field may be included in the case of an encrypted link layer connection in which the payload field size is not 0.

As shown in FIG. 19(b), the header fields may include LLID (Logical Link Identifier), NESN (Next Expected Sequence Number), SN (Sequence Number), MD (More Data), CP (CTEInfo Present), RFU (Reserved). for Future Use). The RFU corresponds to a part reserved for future use when necessary, and its value may be usually filled with 0. Also, according to the value of the CP field, the header field may further include a Constant Tone Extension Information (CTEInfo) subfield. In addition, the Length field may indicate the size of the payload, and when the MIC is included, it may indicate the length of the payload and the MIC.

FIG. 19(c) illustrates an exemplary format of an LL Control PDU. The LL Control PDU may correspond to a data physical channel PDU used to control link layer connection. The LL Control PDU may have a fixed value according to an operation code (Opcode). The Opcode field may indicate the type of the LL Control PDU. The control data (CtrData) field may have various formats and lengths specified by the Opcode.

For example, the Opcode of the LL Control PDU may have a value (e.g., 0x1F, 0x20, 0x21, 0x22, . . . ) indicating one of LL_CBIS_REQ, LL_CBIS_RSP, LL_CBIS_IND, LL_CBIS_TERMINATE_IND, LL_CBIS_SDU_CONFIG_REQ, and LL_CBIS_SDU_CONFIG_RSP.

When the opcode indicates LL_CBIS_REQ, the CtrData field may include information necessary for a CBIS request together with CBISS identification information and CBIS identification information. Similarly, in each case where the Opcode indicates one of LL_CBIS_RSP, LL_CBIS_IND, LL_CBIS_TERMINATE_IND, LL_CBIS_SDU_CONFIG_REQ, LL_CBIS_SDU_CONFIG_RSP, the CtrData may include information required for a CBIS response, a CBIS indication, a CBIS termination indication, a CBIS Service Data Unit (SDU) setup request, and a CBIS SDU setup response.

FIG. 19(d) illustrates an example of audio data PDU format.

Audio data PDU may be CBIS PUD or broadcast isochronous PDU. When used in a CBIS stream, the audio data PDU may be defined as CBIS PDU. When used in a broadcast isochronous PDU, the audio data PDU may be defined as broadcast isochronous PDU.

The audio data PDU may include a 16-bit length header field and a variable length payload field. Also, the audio data PDU may further include a MIC field.

In the case of a CBIS PDU, the format of the header field may include 2-bit LLID, 1-bit NESN, 1-bit SN, 1-bit Close Isochronous Event (CIE), 1-bit RFU, 1-bit Null PDU Indicator (NPI), 1-bit RFU, 9-bit Length subfield.

In the case of broadcast isochronous PUD, the format of the header field may include 2-bit LLID, 3-bit Control Subevent Sequence Number (CSSN), 1-bit Control Subevent Transmission Number (CSTF), 2-bit RFU, and 8-bit Length subfield.

The payload field of audio data PDU may include audio data.

FIGS. 20(a)-20(d) are diagram illustrating examples of an advertisement unit format to which the present disclosure is applicable.

FIG. 20(a) shows an exemplary format of an Advertising Physical Channel PDU (Protocol Data Unit). The advertising channel PDU may be used to transmit packets on an advertising physical channel (e.g., channel numbers 37, 38, 39). The advertising channel PDU may consist of a header of 2 octets and a payload of 6 to 37 octets.

FIG. 20(b) shows an exemplary format of a header of an advertising channel PDU. The header may include a PDU type, a Reserved for Future Use (RFU), a transmission address (TxAdd), a reception address (RxAdd), a length (Length), and an RFU field. The length field of the header may indicate the size of the payload.

FIG. 20(c) shows an exemplary format of a payload of an advertising channel PDU. The payload may include an Advertiser Address (AdvA) field with a length of 6 octets and an AdvData field with a length of 0 to 31 octets. The AdvA field may include a public address or a random address of the advertiser. The AdvData field may include zero or more advertising data (AD) structures, and padding if necessary.

FIG. 20(d) shows a format of one AD structure. The AD structure may include three fields. A length field may indicate a length of a AD Data field. That is, a value obtained by subtracting 1 from the value indicated by the length field may correspond to the length of the AD Data field. The AD Type field may indicate a type of data included in the AD Data field. The AD Data field may include advertising data provided from a host of an advertiser.

Hereinafter, embodiments for audio routing according to the present disclosure will be described.

Audio routing includes determining on which device stream-able audio data, such as media or calls, will be processed (rendered, played, recorded, input, output, etc.). Specifically, audio routing includes active audio routing, which routes currently streaming audio. In addition, audio routing may be configured for an audio routing endpoint or a device associated with audio processing. That is, examples of audio routing of the present disclosure do not determine which device or end to process the audio, when starting an audio service anew, but rather includes processing audio in process in association with a first device or first audio routing end (e.g., the first device/end being input or output) in association with a second device or second audio routing end (e.g., causing the second device/end to input or output).

Figure 21:
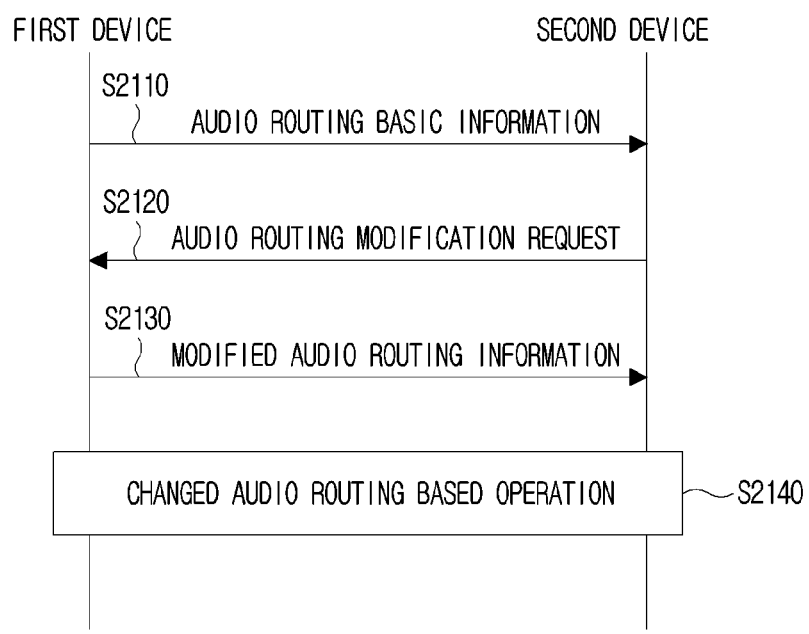
FIG. 21 is a flowchart for describing an audio routing method to which the present disclosure may be applied.

FIG. 21 is a flowchart for describing an audio routing method to which the present disclosure may be applied.

In FIG. 21, the first device is a server of content control service or audio routing service and the second device is a client of content control service or audio routing service.

In step S2110, the first device may transmit audio routing basic information to the second device.

The first device may provide the audio routing basic information to the second device at the request of the second device or without a request of the second device.

The audio routing basic information may include at least one of information on an available audio routing device, information on a configured audio routing device, or audio routing content type information.

For example, the information on an available audio routing device may include at least one of a device identifier list, input characteristic information, output characteristic information, or friendly name information.

For example, the information on the configured audio routing device may include at least one of an input device identifier list for each currently configured audio routing, or an output device identifier list.

For example, the audio routing content type information may include information on a content type associated with each currently configured audio routing.

In step S2120, the first device may receive an audio routing modification request message from the second device.

For example, the second device may request the first device to modify the audio routing basic information maintained and managed by the first device through a write request message. For example, the second device may determine a modification target for the information on the configured audio routing device based on at least one of the information on the available audio routing device or audio routing content type information.

For example, the modification target for the information on the configured audio routing device may include at least one of an output audio routing device identifier, or input audio routing device identifier.

The first device may modify the audio routing basic information at the request of the second device. For example, the information on the configured audio routing device among the audio routing basic information may be modified.

In step S2130, the first device may transmit the modified audio routing information to the second device.

For example, the modified audio routing information may include modified information on the configured audio routing device.

For example, the first device may transmit the modified audio routing information to one or more other devices. The one or more devices may or may not include the second device. For example, the first device may transmit the modified audio routing information to one or more devices to perform audio processing according to the changed audio routing.

In step S2140, one or more of the first device or the second device may perform an operation based on the changed audio routing. The modified audio routing-based operation may include performing or supporting audio processing according to the changed audio routing of one or more of the first device or the second device itself, or another device.

For example, one or more of the first device or the second device may or may not directly perform audio processing prior to modifying the audio routing. For example, one or more of the first device or the second device may or may not directly perform audio processing prior to modifying the audio routing.

That is, the first device may not necessarily be required to directly perform audio processing before or after changing the audio routing, and maintain audio routing basic information related to audio processed by itself or another device and notify the modified audio routing information to other devices. In addition, the second device may not necessarily be required to directly perform audio processing before or after changing the audio routing, and may request modification of audio routing related to audio processed by itself or another device.

Like this, by supporting routing of active audio currently being processed, devices involved in audio processing may be flexibly changed and a seamless audio experience may be provided to the user.

For example, audio routing may include determining a device on which audio processing is executed according to a user's manipulation or a preconfigured audio routing policy. The audio routing policy may be generated, updated, maintained and applied by one or more of the first device and the second device.

In addition, the audio routing may include a protocol for determining device on which the audio data will be processing.

The audio routing policy may include a priority. Priority may be given based on various units related to audio transmission/reception.

For example, the audio routing policy may give the priority based on the content type. In addition, the audio policy may give the priority to one or a combination of two or more of a content, a device, a channel, a stream, a profile, a protocol, audio location, audio group, ASA, and ASS, which are various units related to audio transmission and reception.

For example, the audio policy may give priority to one or a combination of two or more of a content type, a device type, channel ID, stream ID, a profile type, a protocol type, audio location ID, audio group ID, a channel type (ICL or INCL), ASA ID, or ASS ID.

In addition, the audio routing policy may include configuration for the audio processing device according to the content type and the like. For example, the audio routing policy may include what device is to process a specific content type (e.g., ring tone audio), whether the specific audio processing device has a high priority over other audio content types, what type of audio content, and the like. This audio routing policy may be shared in advance between devices.

Figure 22:
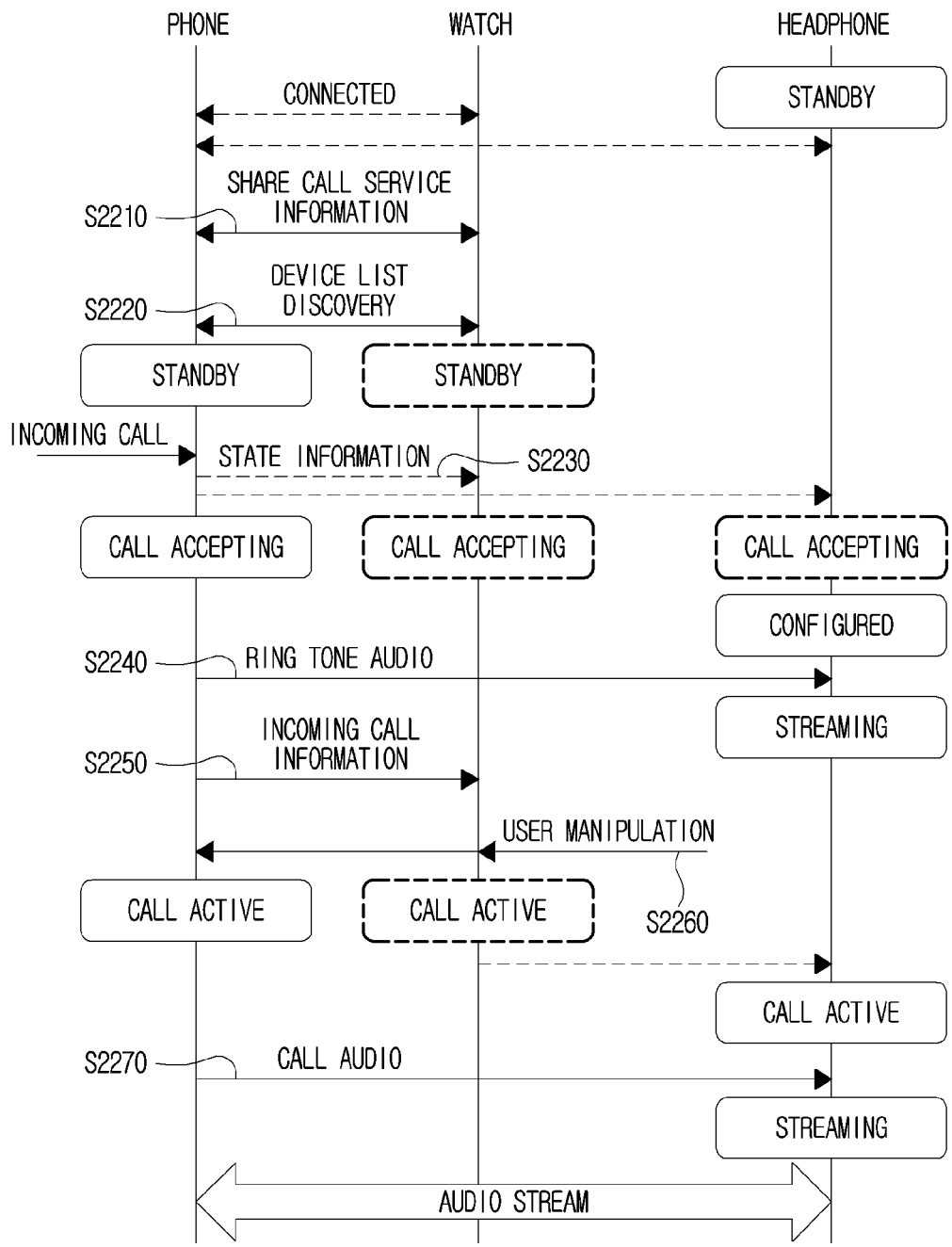
FIG. 22 is a diagram for describing an example of audio routing to which the present disclosure may be applicable.

FIG. 22 is a diagram for describing an embodiment of audio routing to which the present disclosure is applicable.

A phone may correspond to a content control server, and a watch may correspond to a content control client. The phone and the watch may be in a connected state. Also, the phone may correspond to an audio source device and may be in a state of being connected to a headphone that is an audio sink device.

The watch and the headphone may exchange information with the phone. Here, the watch and the phone may be connected, or even if not connected, the watch and the phone may be in a state in which they are ready to transmit information to the other party by sharing an identifier (ID) or an address. Similarly, the headphone and the phone may be connected, or even if not connected, the headphone and the phone may be in a state in which they are ready to transmit information to the other party by sharing an identifier (ID) or an address.

In addition, the phone and the headphone may be in an AUDIO STANDBY state through an ASS discovery procedure or the like.

In step S2210, the phone and the watch device may perform a call service information sharing procedure. For example, the phone may share stored call service information with the watch. The call service information may include contact information, a target caller ID list, and the like.

In step S2220, the phone and the watch may perform a device list discovery procedure. Accordingly, the watch may identify device information connected to the phone (e.g., information indicating that the headphones are connected to the phone).

The phone in the AUDIO STANDBY state may transition to a call accepting state when a call is received (e.g., ringing).

The watch may or may not maintain a state machine. If the watch maintains the state machine, the phone may transmit information notifying that its state transitions to the call acceptance state to the watch. Similarly, the phone may notify the watch of any changes in its state, so that the watch maintains the same state as the phone. If the watch does not maintain the state machine, the phone may not notify the watch of its state change.

In addition, the phone may transmit information notifying that its state transitions to the call acceptance state to the headphone. Accordingly, the headphone may also transition to the call acceptance state in the same way as the phone.

In step S2240, the phone in the call acceptance state may transmit ring tone audio to the headphone. For example, the phone may transmit a ring tone through an audio link formed between the phone and the headphone.

The headphone may transition to the AUDIO CONFIGURED state to prepare to receive the ring tone. For example, when the call control service state machine of the headphone transitions to the call acceptance state, the audio stream state machine may transition to the AUDIO CONFIGURED state. Thereafter, the headphones may transition to the AUDIO STREAMING state as the ring tone is received and stream the ring tone audio.

In step S2250, the phone may transmit information on the incoming call (e.g., information indicating who the call originated from (target caller ID)) to the watch. Accordingly, the watch may notify the user of information on the incoming call.

In step S2260, the user may input a user action for an incoming call through manipulation of the watch. For example, the user may input an action such as receiving a call, sending a call, or ending a call through manipulation of the watch. For example, if a user selects to receive an incoming call for an incoming call, the user may also select through which device to process the phone call audio. For example, the user may input a user action to listen to audio of a phone call through headphones.

In this case, the watch may notify the phone that an event corresponding to the user action has occurred. Accordingly, the phone may transition to a call active state. If the watch maintains a state machine, the watch may also transition to the call active state.

In addition, the watch may the headphone that an event corresponding to the user action has occurred. Accordingly, the headphone may transition the state machine of the call control service to the call active state.

In addition, the headphone may prepare to process phone call audio and transition the audio stream state machine to the AUDIO STREAMING state.

The phone may transmit call audio (e.g., voice data) through the headphone and the established audio link. Accordingly, streaming of call audio may be performed.

Figure 23:
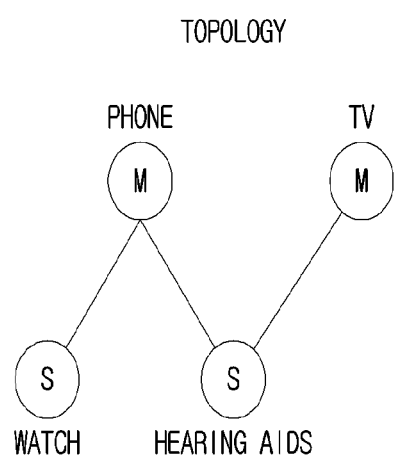
FIG. 23 is a diagram illustrating an example of an audio topology assumed in the example of FIG. 24.
Figure 24:
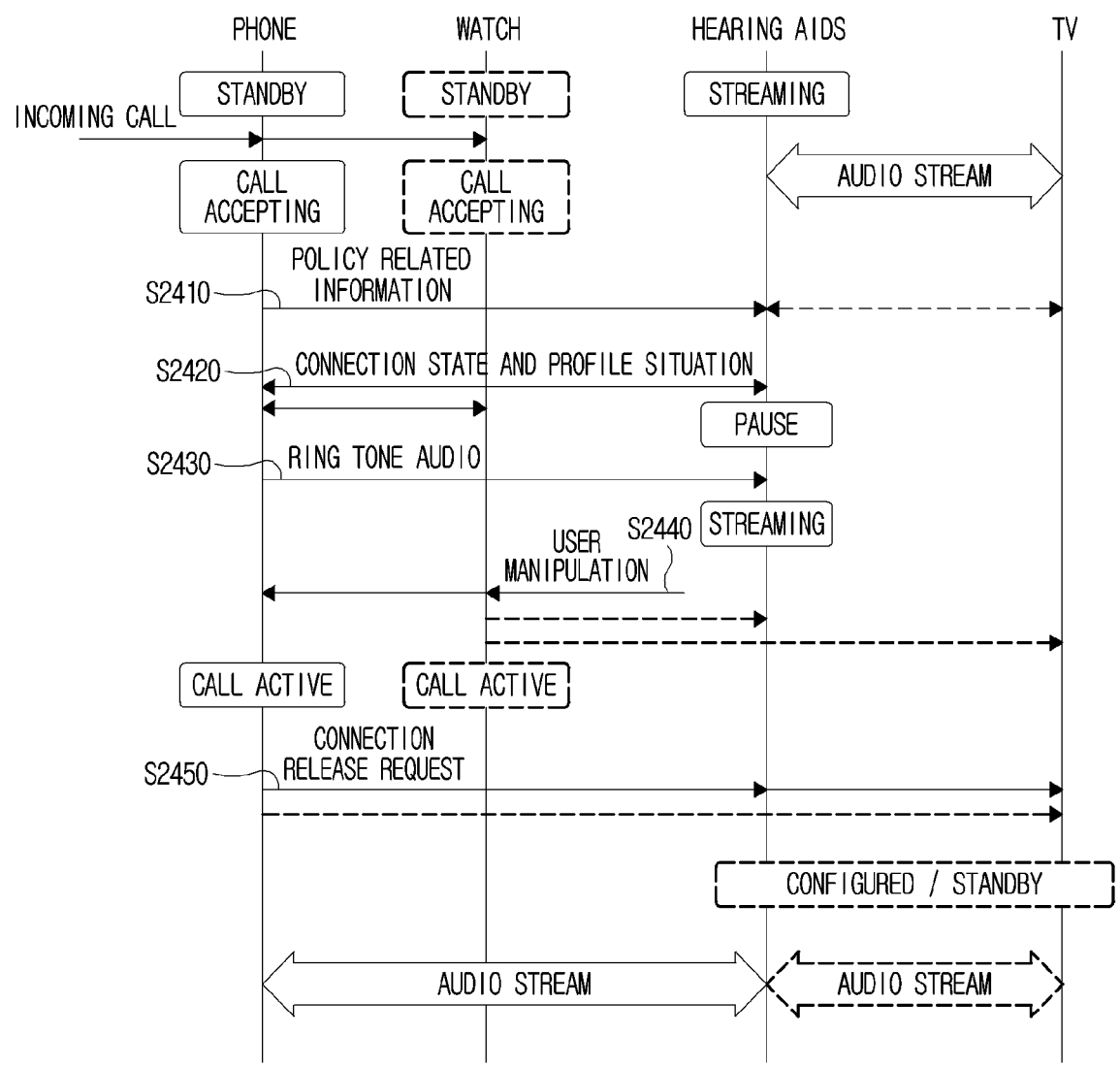
FIG. 24 is a diagram for describing an additional example of audio routing to which the present disclosure may be applicable.

FIG. 23 and FIG. 24 are diagrams for describing an additional example of audio routing to which the present disclosure is applicable.

FIG. 23 illustrates an audio topology assumed in this example. For example, a phone may be connected to a watch and hearing aids, and a TV may be connected to the hearing aid. That is, the watch may be connected to the phone, and the hearing aids may be connected to the phone and the TV. Here, the phone and the TV may correspond to the master device, and the watch and the hearing aids may correspond to the slave device.

In the example of FIG. 24, a phone may correspond to a content control server, and a watch may correspond to a content control client.

First, it is assumed that audio streaming is being performed between the TV and the hearing aids, and the phone may not be related to the audio streaming. That is, the hearing aids may be in the AUDIO STREAMING state, and the phone may be in the AUDIO STANDBY state.

When the phone in the AUDIO STANDBY state receives a call, the state machine of the call control service of the phone may transition to the call acceptance state.

The watch may or may not maintain the state machine. If the watch maintains the state machine, the phone may transmit information indicating that its state transitions to the call acceptance state to the watch. Similarly, the phone may notify the watch of any changes in its state, so that the watch maintains the same state as the phone. If the watch does not maintain a state machine, the phone may not notify the watch of its state change.

Meanwhile, the phone may manage a service policy or an audio routing policy. These policies may include preconfigured priorities for services. For example, the policy may include information on service priority and what type of content type audio service is desired to perform. For example, a content type of a phone call may have a higher priority than a content type of TV audio.

In step S2410, the phone may transmit policy-related information related to the hearing aids. The policy delivered to the hearing aids may also be delivered to the TV. Also, the policy-related information managed by the TV may be transmitted to the hearing aids.

In step S2420, the phone may transmit connection status information, profile status information, and the like to each of the watch and the hearing aids. The connection context information, profile context information, and the like may include information on a state related to streaming and content types.

Accordingly, the hearing aids may pause streaming for TV audio. For example, the hearing aids that was in the AUDIO STREAMING state may transition to the AUDIO CONFIGURED state.

In step S2430, the phone may transmit ring tone audio to the hearing aids, and the hearing aids may stream the ring tone audio.

The phone may notify the user of information on the incoming call through the watch. In step S2440, the user may input a user action for an incoming call through manipulation of the watch. For example, the user may select to receive a call and input the user action for processing the phone call audio through which device. The watch may notify one or more of the phone, the hearing aids, and the TV that an event corresponding to the user action has occurred. Accordingly, the phone may transition to the call active state, and if the watch also has a call control service state machine, it may transition to the call active state.

For example, the user input the user action to listen to the phone's audio (e.g., calls, music, etc.) with the hearing aids through the watch device.

In this case, in step S2450, the phone may transmit a message requesting the hearing aids to release the connection (or stop the audio stream) between the TV and the hearing aids. Accordingly, the hearing aids may transmit a message requesting to release the connection (or stop the audio stream) to the TV. Alternatively, the phone may transmit a message requesting the TV to release the connection (or stop the audio stream) between the TV and the hearing aids.

Accordingly, the hearing aids may change the audio stream state with the tv to the AUDIO CONFIGURED or AUDIO STANDBY. For example, the hearing aids may change the state of the audio stream with the TV according to the state and policy of the phone, the TV, or the hearing aid. In addition, the hearing aids may process the phone call audio by changing the audio stream state with the phone to the AUDIO STREAMING state.

Meanwhile, while the hearing aids stream the phone call audio from the phone, it may not stop the audio streaming from the TV. In this case, the connection release request of step S2250 may be replaced with a message for transferring the state and policy of the phone. If the phone call audio has a higher priority than the TV audio, the TV audio streaming may not be stopped in a way that minimizes the volume of the TV audio.

Figure 25:
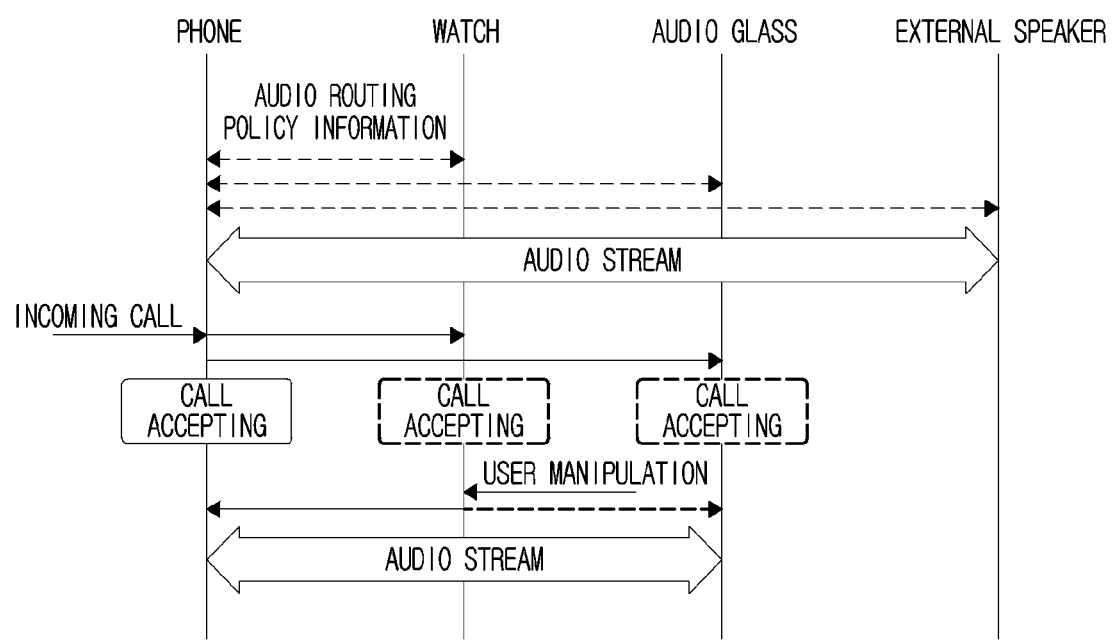
FIG. 25 to FIG. 28 are diagrams for describing additional examples of audio routing to which the present disclosure is applicable.

FIG. 25 is a diagram for describing an additional example of audio routing to which the present disclosure is applicable.

In this example, a phone may exchange information with an watch, an audio glass, and an external speaker. For example, the phone may exchange audio routing policy related information with each of the watch, the audio glass, and external speaker.

The policy related to audio routing may include checking or configuring whether audio reception is possible according to a content type or the like. For example, whether to receive ring tone audio, whether to have a higher priority than other audio content types, etc. may be included in the audio routing policy. This audio routing policy may be shared in advance between devices.

It is assumed that an incoming call occurs while the phone is streaming media content such as music through an external speaker.

When the phone in the AUDIO STANDBY state receives a call, the state machine of the call control service of the phone may transition to the call acceptance state.

The watch and/or audio glass may or may not maintain the state machine. If the watch and/or the audio glasses maintain the state machine, the phone may transmit information indicating that its state transitions to the call acceptance state to the watch and/or the audio glasses. Likewise, the phone may notify the watch and/or audio glasses of any state changes of its own, so that the watch and/or audio glasses remain in the same state as the phone. The phone may not notify and/or audio glasses of its state change if and/or the audio glasses do not maintain the state machine.

In addition, the phone may transmit information indicating that its state transitions to the call acceptance state to an external speaker.

The phone in the call acceptance state may transmit the ring tone to the audio glass. For example, the phone may transmit the ring tone to the audio glasses through an audio link formed between the phone and the audio glasses.

The audio glass may transition to the AUDIO CONFIGURED state and prepare to receive a ring tone. For example, when the call control service state machine of the audio glass transitions to the call accept state, the audio stream state machine may transition to the AUDIO CONFIGURED state. Thereafter, upon receiving the ring tone, the audio glasses may transition to the AUDIO STREAMING state and stream the ring tone.

The phone may transmit information on the incoming call and information indicating who the call is from to the watch. Accordingly, the watch may notify the user of information on the incoming call.

A user may input a user action for an incoming call through manipulation of the watch. For example, the user may select to receive a call with respect to an incoming call through manipulation of the watch.

Here, whether to automatically receive audio data according to a content type may be preconfigured in the audio routing policy. Accordingly, whether to automatically receive audio according to the content type may be determined based on the audio routing policy.

For example, when ring tone audio data originates from a source (e.g., phone), among the peripheral devices (e.g., audio glasses, external speakers), it may be preconfigured whether a certain device processes a specific content type audio (e.g., ring tone audio) and which device does not process a specific content type audio (e.g., ring tone audio). For example, the audio glass may be preconfigured to process ring tone audio, and the external speaker may be preconfigured not to process ring tone audio.

In configuring such an audio routing policy, if the user input interface of the device that processes the audio is not suitable for policy configuration (for example, if the device does not have an input interface such as a button), the audio routing policy of the corresponding device may be configured through a device having a user input interface such as a phone.

According to this preconfigured audio routing policy, ring tone audio may be processed in the audio glass and ring tone audio may not be processed in the external speaker.

The watch may notify the phone that an event corresponding to the user action has occurred. Accordingly, the phone may transition to the call active state. If the watch maintains a state machine, the watch may also transition to the call active state.

In addition, the watch may notify the audio glass that an event corresponding to a user action occurs. Accordingly, the audio glass may prepare to process the phone call audio and transition the audio stream state machine to the AUDIO STREAMING state. In addition, the audio glass may transition to a call active state for a call service.

The phone may transmit call related audio data (e.g., voice data) through the audio link formed with the audio glass. Accordingly, audio streaming for voice data may be performed.

Even in this case, streaming of music audio data processed through the external speaker may not be paused, and streaming may be continuously maintained. That is, audio data related to a phone call may be routed to the audio glass, and music audio data may be routed to the external speaker.

For example, the first user may process music through the external speaker, and the second user may listen to the music processed through the external speaker together with the first user. The music processed through the external speaker may be played from the phone device of the first user. In this case, the third user may transmit a call to the phone device of the first user. The first user may select to receive voice data through audio glass having a microphone and a speaker in response to a call incoming to the phone using the watch device. In this case, since the music may be continuously processed through the external speaker, the second user may continue to listen to the music, and the first user may receive voice data through the audio glass.

Figure 26:
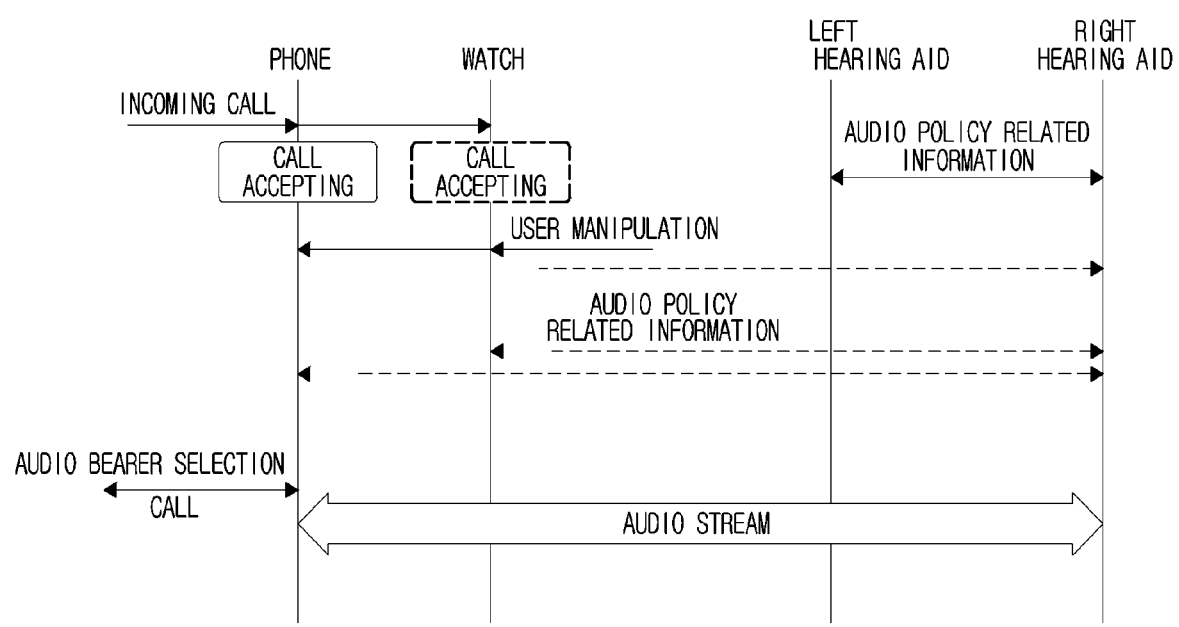

FIG. 26 is a diagram for describing an additional example of audio routing to which the present disclosure is applicable.

In this example, the phone may exchange information with the watch, the left hearing aid, and the right hearing aid. For example, the phone may exchange audio routing policy related information with each of the watch, the left hearing aid, and the right hearing aid.

The policy related to audio routing may include configuration for capability, availability, power check, and the like for selecting one of the set devices. For example, whether to support selecting one of the sets, conditions for availability, selection according to power level, etc. may be included in the audio routing policy.

For example, the audio routing policy may be shared between devices in advance, or may be shared when necessary.

In addition, the audio routing policy may be preconfigured or may be configured by the user if necessary.

In addition, the audio routing policy may be configured through the user interface of the device itself, or may be configured through an external or remote interface (e.g., remote control) connected to the device When the phone in the AUDIO STANDBY state receives the call, the state machine of the call control service of the phone may transition to the call acceptance state.

The watch may or may not maintain the state machine. If the watch maintain the state machine, the phone may transmit information indicating that its state transitions to the call acceptance state to the watch. Similarly, the phone may notify the watch of any changes in its state, so that the watch maintains the same state as the phone. If the watch does not maintain a state machine, the phone may not notify the watch of its state change.

In addition, the phone may transmit information indicating that its state transitions to the call acceptance state to one or more of the left hearing aid or the right hearing aid.

The phone in the call acceptance state may transmit a ring tone to one or more of the left hearing aid or the right hearing aid. For example, the phone may transmit the ring tone to one or more of the left hearing aid or the right hearing aid via through audio link formed between the one or more of the left hearing aid or the right hearing aid.

The one or more of the left hearing aid or the right hearing aid may transition to the AUDIO CONFIGURED state to prepare to receive a ring tone. For example, the one or more of the left hearing aid and the right hearing aid may transition the audio stream state machine to the AUDIO CONFIGURED state when the call control service state machine transitions to the call accept state. Thereafter, the one or more of the left hearing aid and the right hearing aid may stream the ring tone by transitioning to the AUDIO STREAMING state upon receiving the ring tone.

The phone may transmit information on an incoming call and information indicating who the call originated from to the watch. Accordingly, the watch may notify the user of information on the incoming call.

The user may input a user action for an incoming call through manipulation of the watch. For example, the user may select to receive a call with respect to an incoming call through manipulation of the watch.

The watch may notify the phone that an event corresponding to the user action has occurred. Accordingly, the phone may transition to the call active state. If the watch maintains the state machine, the watch may also transition to the call active state.

In addition, the watch may notify one or more of the left hearing aid or the right hearing aid that an event corresponding to the user action has occurred.

Here, the audio routing policy may include configuration for capability, availability, power check, and the like for selecting one of the set devices. For example, for a hearing aid set including a left hearing aid and a right hearing aid, policy information for capability, availability, power check, etc. for selecting one of the left hearing aid or the right hearing aid may be configured.

The audio routing policy information of this hearing aid set may be shared between the left hearing aid and the right hearing aid, or may be shared between one or more of the left hearing aid or the right hearing aid and the phone and the watch. Accordingly, through which device among the left hearing aid or the right hearing aid, it may be determined based on an audio routing related policy. For example, the policy may be configured to stream voice call audio through the right hearing aid.

In this case, the right hearing aid may prepare to process the phone call audio and transition the audio stream state machine to the AUDIO STREAMING state. Also, the right hearing aid may transition to a call active state for a call service.

In addition, audio bearer selection may be performed. For example, since the hearing aid may not have a microphone function, in this case, voice data may be generated through the microphone of the phone and transmitted to an external device (i.e., the counterpart of the phone call). Accordingly, a unidirectional link rather than a bidirectional link may be generated between the phone and the right hearing aid.

For example, the first user may receive a call through the phone device. The battery power level of the first user's hearing aid set is low, so that the first user may stream audio data from the phone device only through the right hearing aid in the hearing aid set, and determine to use the microphone of the phone device for a reverse channel for voice transmission of a phone call. The first user may generate audio routing policy data for this determination and share it with the phone device and the like. Also, this determination may be input via a remote control for operation of the hearing aid set carried by the first user.

Figure 27:
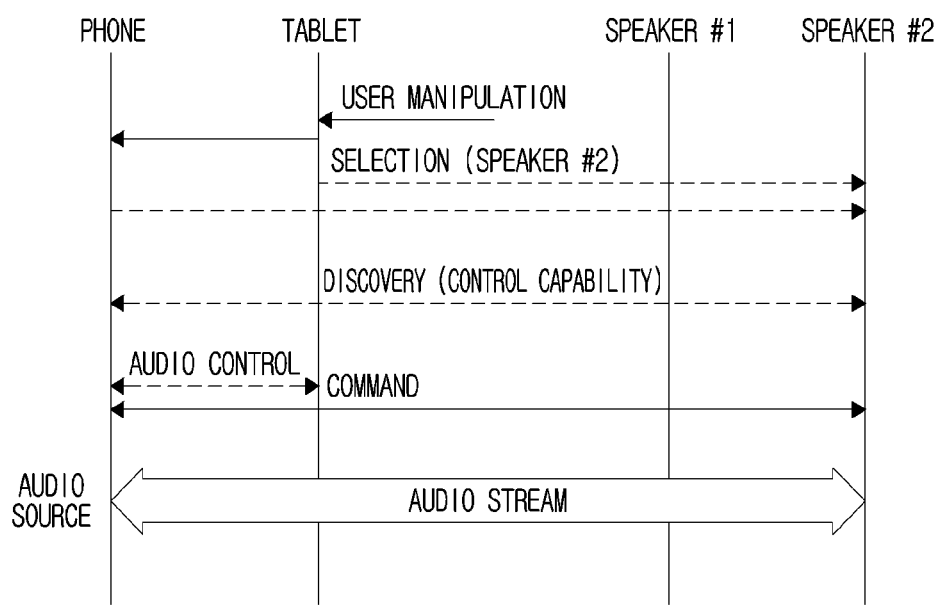

FIG. 27 is a diagram for describing an additional example of audio routing to which the present disclosure is applicable.

In this example, instead of selecting a sink device from the audio source device, an example of audio routing in which a sink device is selected from an external device connected to the source device will be described.

A phone may correspond to a control server, and a table may correspond to a content control client. In addition, the phone may correspond to an audio source device, and may be connected to speakers #1 and #2, which are audio sink devices, but may not be connected yet.

The user may input a user action for selecting the audio sink device through the table. This user action may be transmitted to the phone. For example, when the user action for selecting the speaker #2 is input, it may notify the phone and the speaker #2 that such an event occurs.

Accordingly, the phone may perform a discovery procedure for speaker #2. For example, the discovery procedure may correspond to discovery for control capability or ASC capability.

The phone and speaker #2 may transition from the AUDIO STANDBY state to the AUDIO CONFIGURED state through the ASS configuration procedure according to the discovery procedure, and the AUDIO STREAMING state through the ASS enable procedure.

For example, the user may select audio data to be processed in the phone through the table, and accordingly, an audio control procedure between the phone and the table may be performed. Accordingly, the ASS configuration procedure for an audio stream may be performed between the phone and the speaker #2, and the speaker #2 may transition to the AUDIO CONFIGURED state.

Thereafter, audio data played on the phone is transmitted to the speaker #2, so that the phone and the speaker #2 may transition to the AUDIO STREAMING state.

For example, a user uses a phone device as a source but wants to manage music play through a tablet device. In this case, the tablet device may display a list of speakers capable of streaming music to which the phone device is connected.

Speakers may also be marked with a user-preset friendly name. Accordingly, the user may select a specific speaker by manipulating the tablet device, and listen to music through streaming of audio data transmitted from the phone device to the selected speaker.

Figure 28:
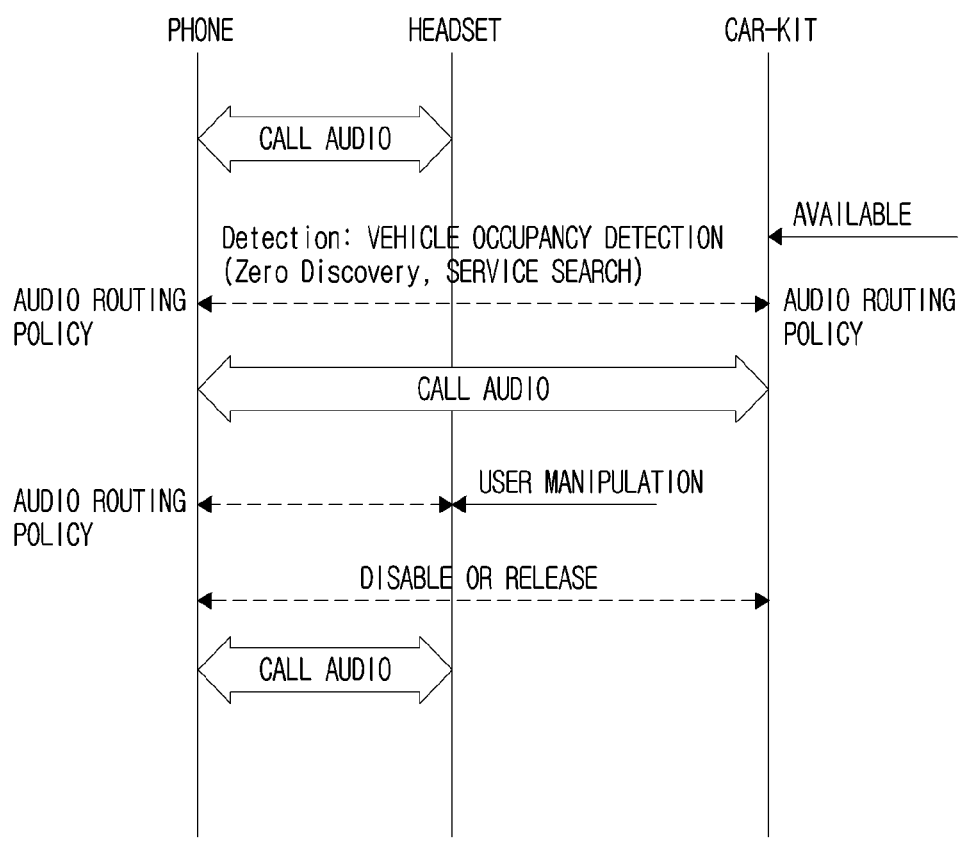

FIG. 28 is a diagram for describing an additional example of audio routing to which the present disclosure is applicable.

In this example, the phone may exchange information with a headset and a car-kit.

In this example, the audio routing policy may include information on the priority of the audio processing device. For example, when both the first device and the second device are capable of audio data processing, which one of the two devices to process the audio data may be preconfigured.

It is assumed that the phone and headset are in a state of streaming call audio. In this case, the car kit device may be in an available state according to vehicle starting.

The phone and the car-kit device may detect each other. For example, when detecting that the user is in the vehicle, the phone and the car kit device may detect each other. Such a detection process may include zero discovery, service discovery, and the like.

For example, the phone may discover the car-kit device in the vehicle and perform a service search. For example, procedures such as ASC discovery and ASC update are performed between the phone and the car-kit device, so that the phone and the car-kit device may transition to the AUDIO STANDBY state.

Through this process, audio routing policy related information may be shared between the phone and the car-kit device.

For example, the audio routing policy may include that the car-kit device has a relatively high priority among the headset device and the car-kit device.

In this case, the headset may transition from the AUDIO STREAMING state to the AUDIO CONFIGURED or AUDIO STANDBY state by going through the ASS deactivation or ASS release procedure. At the same time, the car-kit device may transition to an AUDIO CONFIGURED or AUDIO STREAMING state through an ASS setting or ASS activation procedure.

Accordingly, after the car-kit device is discovered, the audio processing device may be changed from the headset device to the car-kit device.

Meanwhile, even if the audio processing device is automatically changed from the headset to the car-kit device according to the audio routing policy, the audio processing device may be selected again as the headset according to the user's action.

The user's action may be applied preferentially by ignoring the audio routing policy, or a new audio routing policy replacing the existing audio routing policy may be generated and applied according to the user's action.

When the user action is to select a headset as the audio processing device, the occurrence of this user action event may be communicated from the headset to the phone.

Accordingly, the car-kit device may transition from the AUDIO STREAMING state to the AUDIO CONFIGURED or AUDIO STANDBY state through the ASS disable or ASS release procedure. In addition, the headset device may transition to an Audio Configured or Audio Streaming state through the ASS configuration or ASS activation procedure.

Accordingly, the audio processing device may be changed from the car-kit device to the headset device again.

For example, the user may get into the car and start the car while talking on the phone through the headset. In this case, the phone call may automatically transition from the headset to the car-kit device based on the audio routing policy preset by the user.

Meanwhile, an incoming call may occur to the phone device while the user is in the vehicle. In this case, the audio of the phone call may be processed through the speaker of the vehicle based on the audio routing policy preconfigured by the user. The user may want to change the phone call audio processing device to the headset so that other passengers in the vehicle do not hear the contents of the phone call. In this case, the user may request that the phone call counterpart wait, and operate to continue the phone call through the headset after the headset is mounted. Accordingly, the audio processing device may pass from the vehicle speaker to the headset.

In the above examples, the audio routing policy may be configured as shown in Tables 6 and 7 below.

TABLE 6

| | | | Record | | |
|---|---|---|---|---|---|
| Length | Content Type | Output List Size | Output List | Input list size | Input List |
| 6 | Music ID | 2 | 0xDEAF 0x3D2D | 0 | NULL |
| 5 | Voice ID | 1 | 0xDEAF | 1 | 0xDEAF |
| 5 | Others | 1 | 0xA13B | 1 | 0xA13B |

TABLE 7

| | Device/Ser Identifier | Set Size | Connection Status (Bits) | | | Features (Bits) | | | |
|---|---|---|---|---|---|---|---|---|---|
| Length | (1 octet) | (1 octet) | Connected | Around | This device | Output | Input | Use | Friendly Name |
| | 0xDEAF | 2 | 1 | 0 | 0 | 1 | 1 | Music ID | My Hearing Aids |
| | 0xA13B | 1 | 0 | 0 | 1 | 1 | 1 | NULL | My Phone |

An example of Table 6 shows that an identifier of an output (i.e., audio processing) device or service is preconfigured according to a content type. For example, when the content type corresponds to a music ID, a device or service having identification information of 0xDEAF and 0x3D2D may be determined, and if the content type corresponds to a voice ID, a device or service having identification information of 0xDEAF may be determined.

In the example of Table 7, when the device/service identifier is 0xDEAF, the friendly name indicates a device corresponding to My Hearing Aids, and when the device/service identifier is 0xA13B, the nickname indicates a device corresponding to My Phone.

Figure 29:
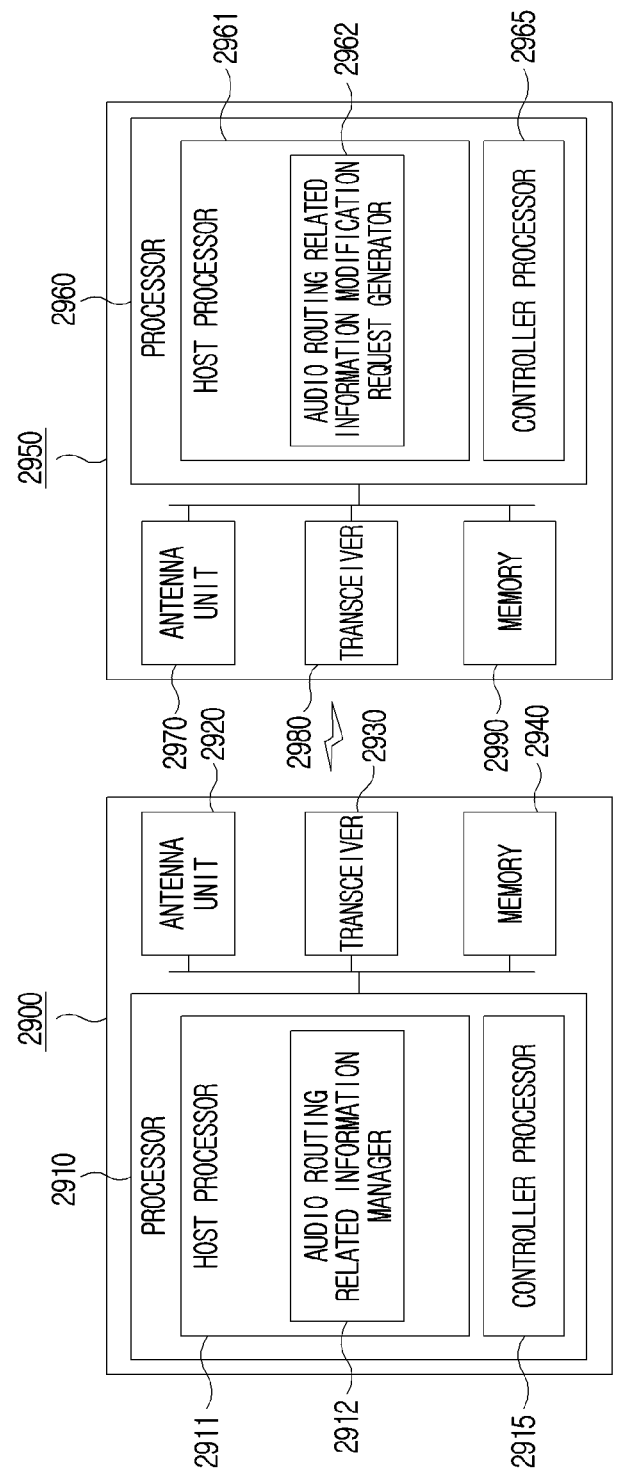
FIG. 29 is a diagram illustrating configuration of the first device and the second device.

FIG. 29 is a diagram illustrating configuration of the first device and the second device.

The first device 2900 may include a processor 2910, an antenna unit 2920, a transceiver 2930, and a memory 2940.

The processor 2910 may perform baseband-related signal processing and may include a host processor 2911 and a controller processor 2915. The host processor 2911 and the controller processor 2915 may exchange information through HCl. The host processor 2911 may process operations such as L2CAP, ATT, GATT, GAP, and LE profile layers. The controller processor 2915 may process operations such as LL and PHY layers. The processor 2910 may control the overall operation of the first device 2900 in addition to performing baseband-related signal processing.

Antenna unit 2920 may include one or more physical antennas.

The transceiver 2930 may include RF (Radio Frequency) transmitter and RF receiver. The memory 2940 may store information processed by the processor 2910 and software, an operating system, and an application related to the operation of the first device 2900, and may include components such as a buffer and the like.

The processor 2910 of the first device 2900 may be configured to implement an operation of the first device (or, the server) in the embodiments described in the present disclosure.

For example, the host processor 2911 of the processor 2910 of the first device 2900 may include an audio routing related information manager 2912.

The audio routing information manager 2912 may maintain, update, and manage audio routing related information stored in the memory 2940. The audio routing related information may include one or more of available audio routing device information, configured audio routing device information, and audio routing content type information.

For example, the audio routing related information manager 2912 may provide the audio routing related information to the second device 2950 as audio routing basic information.

Also, the audio routing-related information manager 2912 may modify or update the audio routing-related information based on a request for modifying the audio routing-related information received from the second device 2950.

In addition, the audio routing related information manager 2912 may provide the modified audio routing related information to the second device 2950.

When the first device 2910 is relate to audio routing (e.g., performing input or output for active audio streaming), the first device 2900 may stop or start processing of audio streaming according to the modified audio routing related information.

The second device 2950 may include a processor 2960, an antenna unit 2970, transceiver 2980, and a memory 2990.

The processor 2960 may perform baseband-related signal processing and may include a host processor 2961 and a controller processor 2965. The host processor 2961 and the controller processor 2965 may exchange information through HCl. The host processor 2961 may process operations such as L2CAP, ATT, GATT, GAP, and LE profile layers. The controller processor 2965 may process operations of the LL layer, the PHY layer, and the like. The processor 2960 may control the overall operation of the second device 2960 in addition to performing baseband-related signal processing.

The antenna unit 2970 may include one or more physical antennas.

The transceiver 2980 may include an RF transmitter and an RF receiver.

The memory 2990 may store information processed by the processor 2960 and software, an operating system, and an application related to the operation of the second device 2950, and may include components such as a buffer and the like.

The processor 2960 of the second terminal device 2950 may be configured to implement the operation of the second device (or client) in the embodiments described in the present disclosure.

For example, the host processor 2961 of the processor 2960 of the second device 2950 may include an audio routing-related information modification request generator 2962.

The audio routing-related information modification request generator 2962 may determine a modification target for audio routing based on the audio routing basic information provided from the first device 2900, and generate a modification request message including the audio routing modification target.

The audio routing basic information may include one or more of available audio routing device information, configured audio routing device information, or audio routing content type information.

The audio routing modification target may include one or more of an output audio routing device identifier or an input audio routing device identifier. When the audio routing-related information maintained in the first device 2900 is modified by the audio routing-related information modification request, the modified audio routing-related information may be provided from the first device 2900 to the second device 2950.

When the second device 2950 may be related to audio routing (e.g., performing input or output for active audio streaming), the second device 2950 may stop or start processing of the audio streaming according to the modified audio routing-related information provided from the first device 2900.

In the operation of the first device 2900 and the second device 2950, the descriptions of the server and the client in the examples of the present invention may a be applied in the same manner, and overlapping descriptions will be omitted.

Various embodiments of the present disclosure may be implemented by hardware, firmware, software, or a combination thereof. For implementation by hardware, various embodiments of the present disclosure may be implemented one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general purpose It may be implemented by a processor (general processor), a controller, a microcontroller, a microprocessor, and the like.

The scope of the present disclosure includes software or machine-executable instructions (e.g., operating system, application, firmware, program, etc.) that cause operation according to the method of various embodiments to be executed on a device or computer, and a non-transitory computer-readable medium in which such software or instructions are stored and executed on a device or computer. Instructions that may be used to program a processing system to perform the features described in this present disclosure may be stored on/in a storage medium or computer-readable storage medium, and features described in the present disclosure may be implemented using a computer program product including such the storage medium.

The storage medium may include, but is not limited to, a high-speed random access memory such as DRAM, SRAM, DDR RAM or other random access solid state memory device, one or more magnetic disk storage devices, optical disk storage devices, flash memory devices, or may include non-volatile memory such as other non-volatile solid state storage devices. The memory optionally includes one or more storage devices located remotely from the processor (s). The memory or alternatively the non-volatile memory device(s) within the memory includes a non-transitory computer-readable storage medium. Features described in this present disclosure may be stored on any one of the machine readable media to control hardware of the processing system, and it may be incorporated into software and/or firmware that allows the processing system to interact with other mechanisms that utilize results in accordance with embodiments of the present disclosure. Such software or firmware may include, but is not limited to, application codes, device drivers, operating systems, and execution environments/containers.

INDUSTRIAL APPLICABILITY

Embodiments of the present disclosure may be applied to various wireless communication systems to increase the performance of the wireless communication system.

The invention claimed is:

1. A method performed by a first device in a wireless communication system, the method comprising:
   transmitting, from the first device to a second device, first availability information related to first at least one context type associated with a first audio stream that is established between the first device and the second device;
   transmitting, from the first device to a third device, second availability information related to second at least one context type;
   based on a context type associated with a second audio stream from the third device being included in the second availability information, accepting the second audio stream with interrupting the first audio stream; and
   based on the context type associated with the second audio stream from the third device not being included the second availability information, rejecting the second audio stream with maintaining the first audio stream,
   wherein the first device is an acceptor maintaining audio streams with a single initiator,
   wherein the second device is an initiator that starts or ends unicast audio streams with the acceptor, and
   wherein the third device is another initiator that starts or ends unicast audio streams with the acceptor.

2. The method according to the claim 1, wherein the at least one context type includes a ringtone, a call-audio, a media playback.

3. The method according to the claim 1, wherein the first device indicates a preference based on the at least one context type.

4. The method according to the claim 1, wherein the accepting the second audio stream is further based on a control of a user through a user interface of the first device.

5. The method according to the claim 1, wherein the first device, the second device, and the third device include Bluetooth low energy (BLE) protocol stack.

6. A first device in a wireless communication system, the device comprising:
   a transceiver for performing a signal transmission and reception with at least one of a second device or third device;
   at least one other device; and
   a processor for controlling the transceiver and the first device,
   wherein the processor is configured to:
     transmit, through the transceiver, from the first device to a second device, first availability information related to first at least one context type associated with a first audio stream that is established between the first device and the second device;
     transmit, through the transceiver, from the first device to third device, second availability information related to second at least one context type;
     based on a context type associated with a second audio stream from the third device being included in the second availability information, accept the second audio stream with interrupting the first audio stream; and
     based on the context type associated with the second audio stream from the third device not being included the second availability information, reject the second audio stream with maintaining the first audio stream,
   wherein the first device is an acceptor maintaining audio streams with a single initiator,
   wherein the second device is an initiator that starts or ends unicast audio streams with the acceptor, and
   wherein the third device is another initiator that starts or ends unicast audio streams with the acceptor.

7. The first device according to the claim 6, wherein the at least one context type includes a ringtone, a call-audio, a media playback.

8. The first device according to the claim 6, wherein the first device indicates a preference based on the at least one context type.

9. The first device according to the claim 6, wherein the accepting the second audio stream is further based on a control of a user through a user interface of the first device.

10. The first device according to the claim 6, wherein the first device, the second device, and the third device include Bluetooth low energy (BLE) protocol stack.

* * * * *